United States Patent [19]

Shibuya

[11] Patent Number: 4,853,840
[45] Date of Patent: Aug. 1, 1989

[54] INSTRUCTION PREFETCHING DEVICE INCLUDING A CIRCUIT FOR CHECKING PREDICTION OF A BRANCH INSTRUCTION BEFORE THE INSTRUCTION IS EXECUTED

[75] Inventor: Toshiteru Shibuya, Tokyo, Japan

[73] Assignee: NEC Corporation, Tokyo, Japan

[21] Appl. No.: 427

[22] Filed: Jan. 5, 1987

[30] Foreign Application Priority Data

| Jan. 7, 1986 | [JP] | Japan | 61-321 |
| Jan. 7, 1986 | [JP] | Japan | 61-322 |
| Jan. 7, 1986 | [JP] | Japan | 61-323 |
| Jan. 7, 1986 | [JP] | Japan | 61-324 |
| Jan. 7, 1986 | [JP] | Japan | 61-325 |
| Jan. 7, 1986 | [JP] | Japan | 61-326 |

[51] Int. Cl.$^4$ ............................ G06F 9/38; G06F 9/42
[52] U.S. Cl. ............................... 364/200; 364/263.1; 364/261.7; 364/261.3; 364/264
[58] Field of Search ... 364/200 MS File, 900 MS File

[56] References Cited

U.S. PATENT DOCUMENTS

| 3,559,183 | 1/1971 | Sussenguth | 364/200 |
| 4,200,927 | 4/1980 | Hughes et al. | 364/200 |
| 4,298,927 | 11/1981 | Berglund et al. | 364/200 |
| 4,430,706 | 2/1984 | Sand | 364/200 |
| 4,521,851 | 6/1985 | Trubisky et al. | 364/200 |
| 4,604,691 | 8/1986 | Akagi | 364/200 |
| 4,710,866 | 12/1987 | Zolnowsky | 364/200 |
| 4,719,570 | 1/1988 | Kawabe | 364/200 |
| 4,757,445 | 7/1988 | Zolnowsky et al. | 364/200 |
| 4,764,861 | 8/1988 | Shibuya | 364/200 |
| 4,777,594 | 10/1988 | Jones et al. | 364/200 |

FOREIGN PATENT DOCUMENTS

0109655 5/1984 European Pat. Off. .
0157125 10/1985 European Pat. Off. .

Primary Examiner—Thomas M. Heckler
Assistant Examiner—Kevin A. Kriess
Attorney, Agent, or Firm—Foley & Lardner, Schwartz, Jeffery, Schwaab, Mack, Blumenthal & Evans

[57] ABSTRACT

In a data processing system capable of processing instructions under pipeline control in a plurality of stages including an executing stage, an instruction prefetching device comprises a prediction checking circuit (66, 67) coupled to a predicting circuit (52, 53) and an instruction executing circuit (32, 33, 37, 38) and a prefetch controlling circuit (47, 86) coupled to the predicting circuit and the checking circuit. In one of the stages that is prior to the executing stage, the checking circuit checks whether or not a prediction for a branch destination is correct. If the prediction is correct, prefetch is continued according to the prediction. If the prediction is incorrect prediction, the prefetch is continued according to a correct prediction with the incorrect prediction corrected immediately after the executing stage. Check of the prediction may be for an instruction other than branch instructions, for either an unconditional branch instruction or a branch count instruction, for a branch destination address, or for a branch direction which becomes clear after the executing stage.

21 Claims, 13 Drawing Sheets

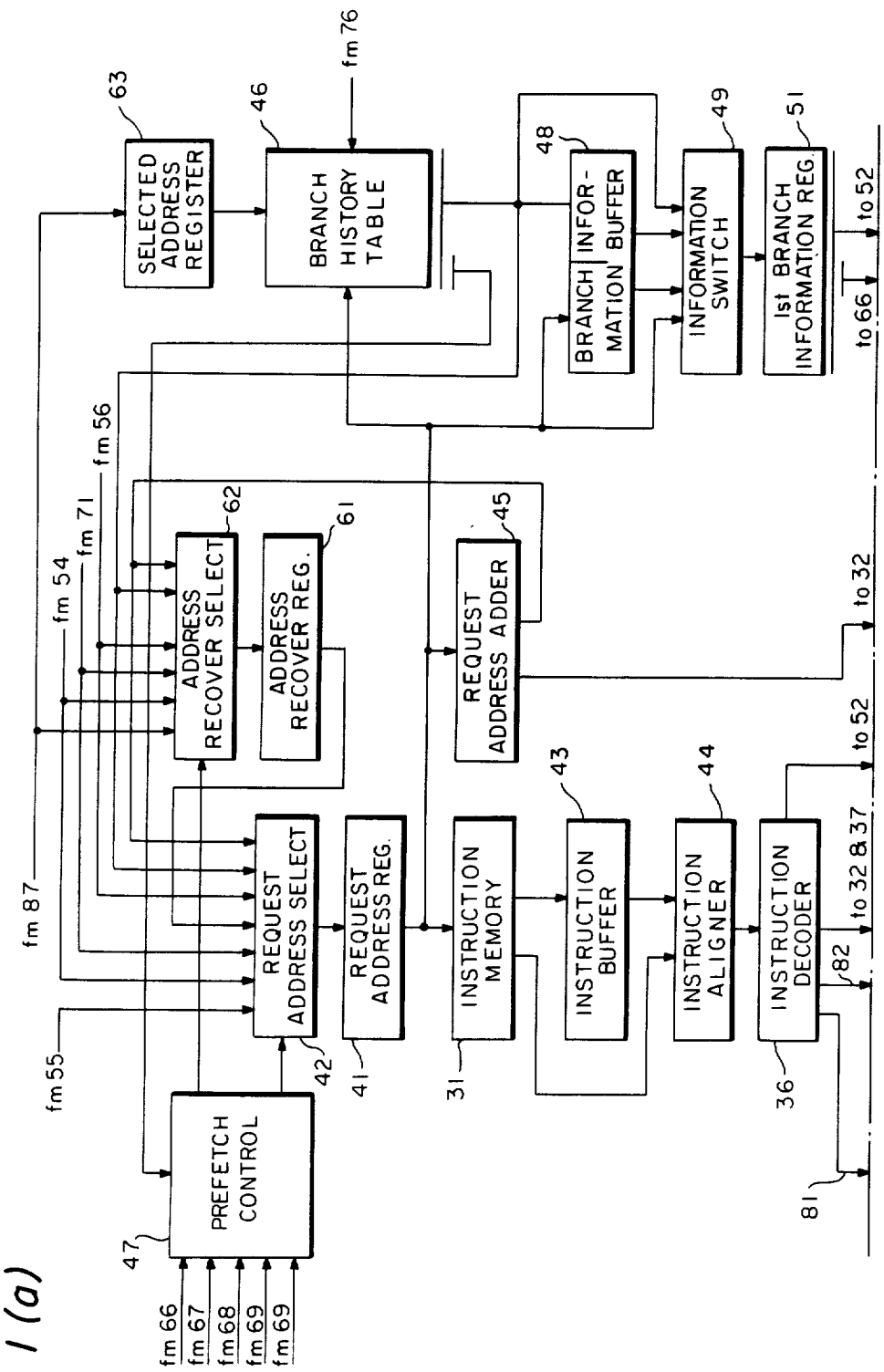

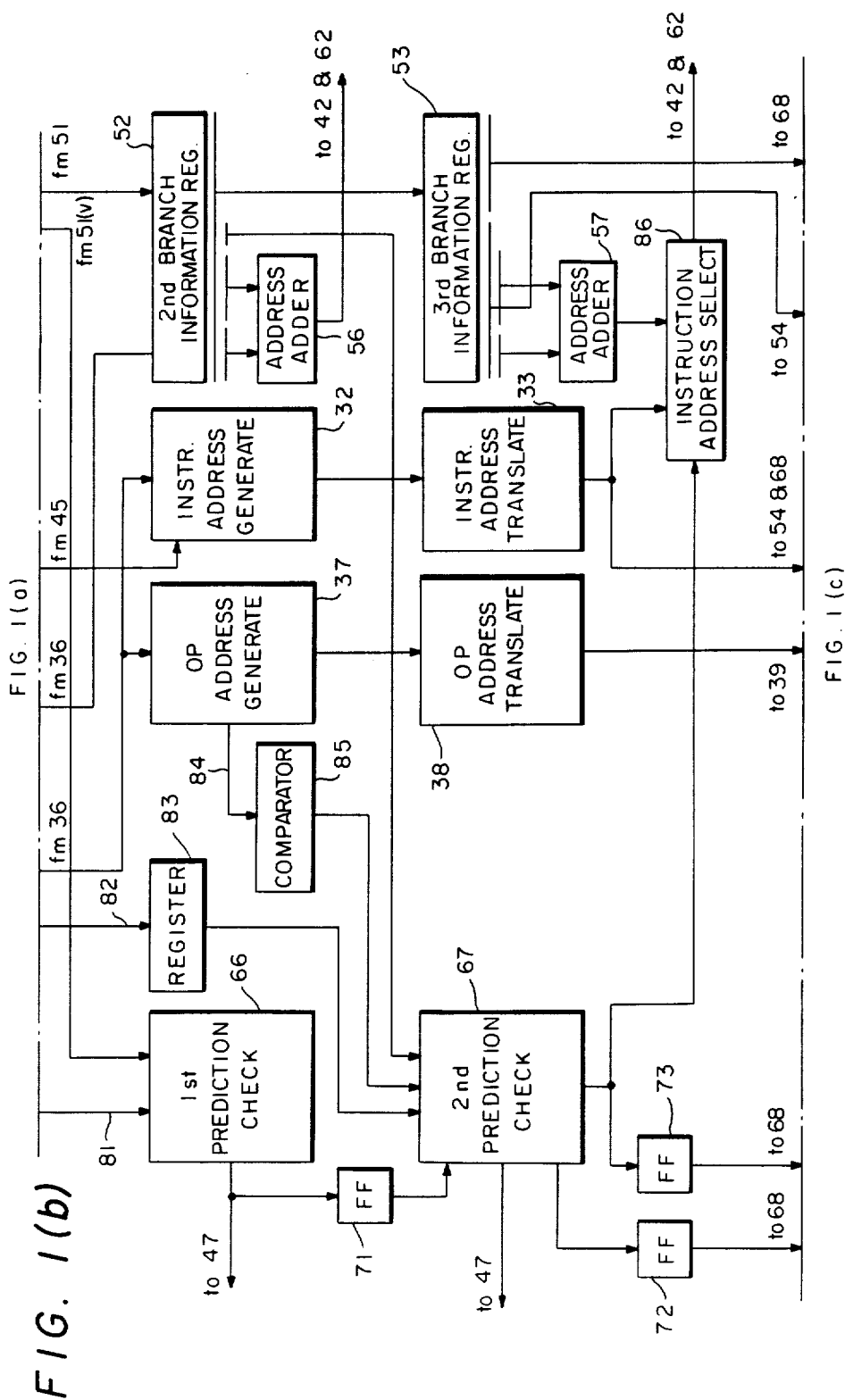

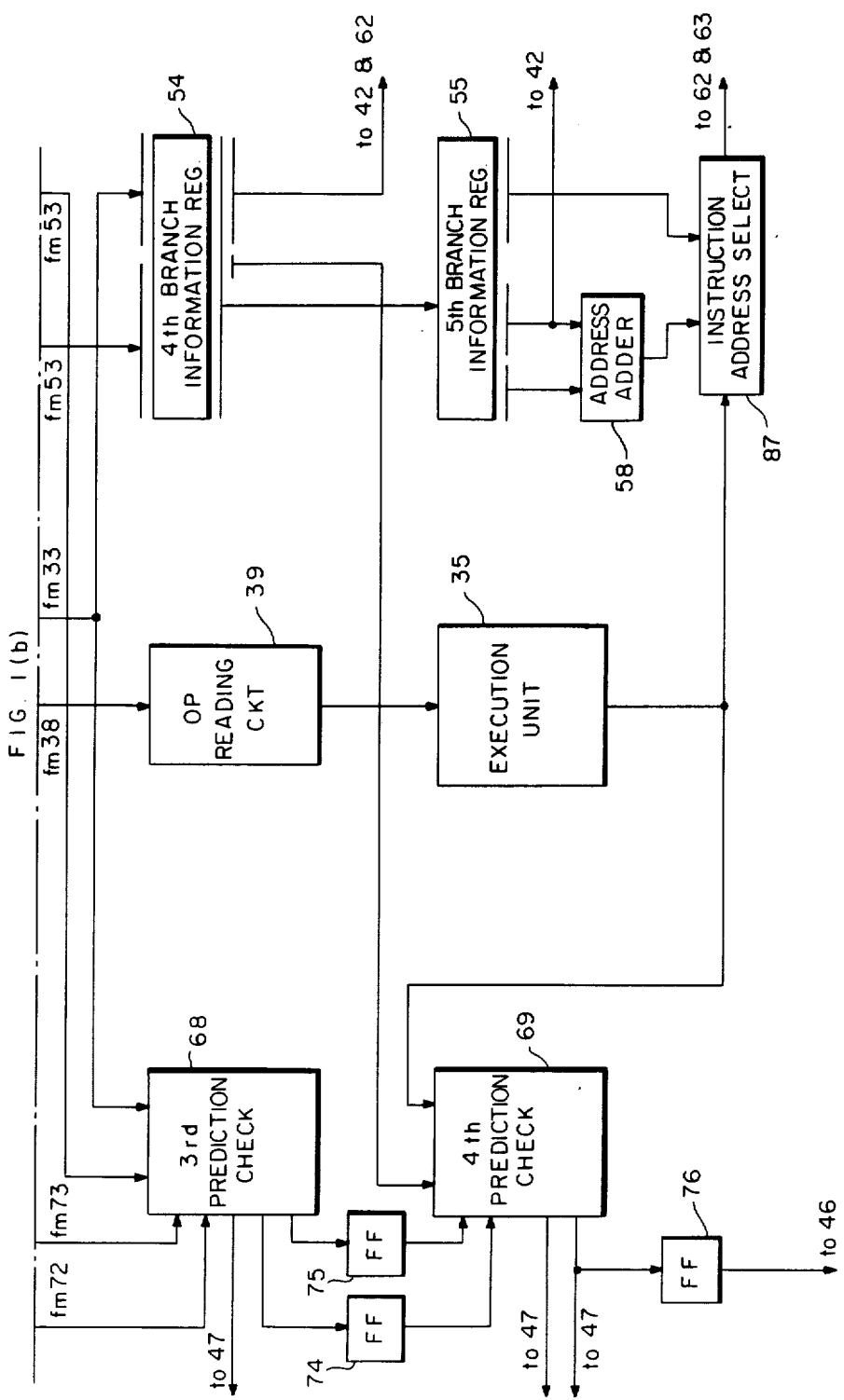

| | 0 | 1 | 2 | 3 | 4 | 5 | 6 | 7 | 8 |
|---|---|---|---|---|---|---|---|---|---|
| V in 53 | | | | ⊓ | | | | | |
| ADDRESS in 53 | | | | ╳ CI ╳ | | | | | |
| fm 33 to 54, 68, & 86 | | | | ╳ DI ╳ | | | | | |
| fm 68 to 47 | | | | | ⊓ | | | | |
| fm 54 to 42 & 62 | | | | | ╳ DI ╳ | | | | |
| fm 54 to 69 | | | | | ⊓ | | | | |
| 74 | | | | | | ⊓ | | | |
| 75 | | | | | | ⊓ | | | |
| fm 35 to 69 | | | | | | ─── | | | |
| fm 69 to 47 | | | | | | ⊓ | | | |
| fm 69 to 47 & 76 | | | | | | ⊓ | | | |
| fm 87 to 62 & 63 | | | | | | ╳ AI ╳ | | | |
| 63 | | | | | | | ╳ AI ╳ | | |
| 61 | | | | | | | ╳ AI ╳ | | |
| 41 | ╳ CBI ╳ CI ╳ CI+8 ╳ CI+16 ╳ CI+24 ╳ DI ╳ CBI ╳ AI ╳ AI+8 ╳ |
| CBI | IC | ID | OA | OT | OC | EX | HU | | |
| CI | | | IC | ID | OA | OT | | | |
| C2 | | | | IC | ID | OA | | | |
| C3 | | | | | IC | ID | | | |
| C4 | | | | | IC | | | | |
| DI | | | | | | IC | | | |
| AI | | | | | | | | IC | ID |

INSTRUCTION PREFETCHING DEVICE INCLUDING A CIRCUIT FOR CHECKING PREDICTION OF A BRANCH INSTRUCTION BEFORE THE INSTRUCTION IS EXECUTED

BACKGROUND OF THE INVENTION

This invention relates to an instruction prefetching device for use in combination with a data or information processing system which includes an executing circuit for executing a sequence of instructions with each instruction processed successively in a plurality of stages.

Such an instruction prefetching device is for carrying out prefetch of at least one instruction from the sequence to form a queue of instructions in an instruction buffer and is already known. For example, an instruction prefetching device is disclosed in U.S. patent application Ser. No. 552,223 filed Nov. 16, 1983 (EPC Patent Application No. 83 111 451.7), by Syuichi Hanatani et al, including the present applicant, based on original Japanese Patent Application No. 201,550 of 1982 and others. Another instruction prefetching device is revealed in U.S. Pat. No. 4,607,229 which was issued Aug. 19, 1986 (EPC Patent Application No. 85 101 351.6), by the present applicant based on basic Japanese Patent Application No. 21,114 of 1984 and another basic Japanese patent application and which will herein be called an elder patent application. Incidentally, each of the above-mentioned plurality of stages is processed in a machine cycle. The stages include an executing stage of executing each instruction to provide a result of calculation which is indicated by the instruction in question.

According to the Hanatani et al patent application and the elder patent application, the instruction prefetching device includes a branch history table as a main element of a predicting arrangement. Responsive to an instruction address which is set in an instruction address register at a time, the predicting arrangement produces branch information obtained when an instruction having the instruction address was actually processed in the executing state prior to prefetch of the instruction under consideration. The predicting arrangement produces the branch information as predicted branch information. The instruction having the instruction address may be called a particular instruction merely for convenience of distinguishing the instruction in question from other instructions of the sequence.

The instruction prefetching device of the Hanatani et al patent application or of the elder patent application comprises a prediction checking or evaluating arrangement and a prefetch controlling arrangement. The prediction checking arrangement is coupled to the predicting arrangement and the executing circuit to carry out a check, immediately after the executing stage for the particular instruction, as regards whether the predicted branch information is correct or incorrect. The prefetch controlling arrangement is coupled to the predicting arrangement and the prediction checking arrangement to allow continuance of the prefetch in compliance with the predicted branch information when the predicted branch information is correct. When the predicted branch information is incorrect, the prefetch controlling arrangement corrects the continuance.

The instruction prefetching device of the Hanatani et al patent application is operable with only a short average loss cycle. The instruction prefetching device of the elder patent application is also operable with only a short average loss cycle and is particularly effective when the particular instruction is a branch on count instruction. It is, however, desirable to check as early as possible the predicted branch information and to decide whether the prefetch should be continued or corrected.

SUMMARY OF THE INVENTION

It is therefore an object of the present invention to provide an instruction prefetching device which is for use in combination with a data processing system including an executing circuit for executing a sequence of instruction with each instruction processed successively in a plurality of stages including an executing stage and which can check predicted branch information in at least one of the stages that is prior to the executing stage.

Other objects of this invention will become clear as the description proceeds.

An instruction prefetching device which this invention is applicable, is for use in combination with a data processing system including executing means for executing a sequence of instructions with each instruction processed successively in a plurality of stages which include an executing stage. The instruction prefetching device is for carrying out prefetch of at least one instruction from the sequence and includes predicting means responsive to an instruction address for producing branch information obtained when a particular instruction having the instruction address was processed in the executing stage prior to the prefetch of the particular instruction, the predicting means producing the branch information as predicted branch information. According to this invention, the instruction prefetching device is characterized by: prediction checking means coupled to the predicting means the executing means for carrying out a check, in at least one of the stages that is prior to the executing stage for the particular instruction, as regards to whether the predicted branch information is correct or incorrect; and prefetch controlling means coupled to the predicting means and the prediction checking means for allowing continuance of the prefetch of a subsequent instruction when the predicted branch information is correct, the prefetch controlling means correcting the continuance when the branch information is incorrect, the subsequent instruction next following the particular instruction in the sequence.

BRIEF DESCRIPTION OF THE DRAWINGS

FIG. 1 extended over three sheets (a) through (c), is a block diagram of a data processing system which includes an instruction prefetching device according to a first embodiment of the instant invention;

FIG. 16 is another schematic time chart for use in describing operation of the instruction prefetching device depicted in FIG. 1;

FIG. 17 is a further schematic time chart for use in describing operation of the instruction prefetching device shown in FIG. 1.

DESCRIPTION OF THE PREFERRED EMBODIMENTS

Figure 2:
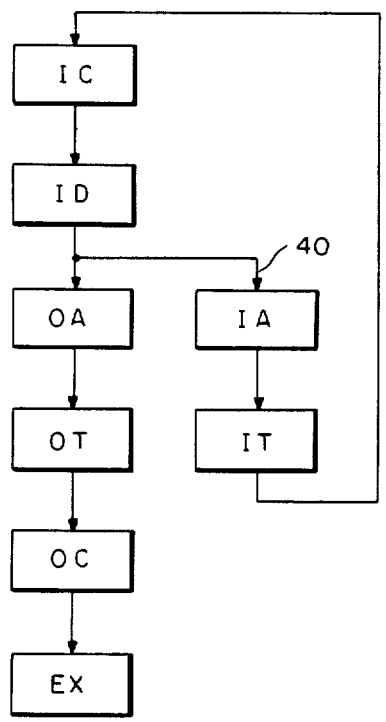
FIG. 2 is a diagram for use in describing operation of the data processing system depicted in FIG. 1.

Referring to FIG. 1, a data or information processing system comprises an instruction prefetching device according to a first embodiment of the present invention. Before, describing the instruction prefetching device, an example of the data processing system will be described in order to facilitate an understanding of this invention.

It is known in the art that a data processing system is divisible into a plurality of units as, for example, an instruction memory 31, an instruction address generating circuit 32, an instruction address translating circuit 33, an instruction executing unit 35, an instruction decoding circuit 36, an operand address generating circuit 37, an operand address translating circuit 38, and an operand reading circuit 39. The instruction memory 31 is for memorizing a sequence of instructions. The operand reading circuit 39 includes an operand memory (not shown). Depending on the circumstances, a combination of the instruction address generating circuit 32, the instruction address translating circuit 33, the instruction executing unit 35, the instruction decoding circuit 36, the operand address generating circuit 37, the operand address translating circuit 38, and the operand reading circuit 39 is herein called an instruction executing circuit or arrangement.

Although not depicted, a main memory may be used in common as the instruction memory 31 and the operand memory of the operand reading circuit 39. The instruction memory 31 and the operand memory may be instruction and operand cache memories. In the manner known in the art, each cache memory holds a copy of a portion of the main memory. A common circuit may be used by the instruction address generating circuit 32 and the operand address generating circuit 37, by the instruction address translating circuit 33 and the operand address translating circuit 38, or by the instruction memory 31 and the operand memory of the operand reading circuit 39.

Turning to FIG. 2, it is possible to understand that each instruction is processed generally in eight stages a follows.

(1) An instruction address generating (IA) stage: The instruction address generating circuit 32 generates a logical instruction address of an instruction which should be executed;

(2) An instruction address translating (IT) stage: The instruction address translating circuit 33 translates the logical instruction address to a real instruction address;

(3) An instruction reading (IC) stage: The real instruction address is used in reading the instruction from the instruction memory 31 or preferably from the instruction cache memory;

(4) An instruction decoding (ID) stage: The instruction decoding circuit 36 decodes the instruction to provide a result of decoding;

(5) An operand address generating (OA) stage: Responsive to the result of decoding, the operand address generating circuit 37 generates a logical operand address of at least one operand;

(6) An operand address translating (OT) stage: The operand address translating circuit 38 translates the logical operand address to a real operand address;

(7) An operand reading (OC) stage: Responsive to the real operand address or addresses, the operand reading circuit 39 produces the operand or operands from the operand memory of the operand reading circuit 39 or preferably from the operand cache memory; and (8) An executing (EX) stage: The instruction executing unit 35 executes the instruction.

Use of an address translating buffer makes it possible to process the instruction and the operand address translating stages at a high speed if the address translating buffer includes a translating table for carrying out the translation. Use of the cache memory makes it possible to process the instruction and the operand reading stages at a high speed if the cache memory includes the instruction and the operand or operands which should be read out. When it is possible to process the instruction and the operand address translating stages and the instruction and the operand reading stages at high speed, the data processing system can execute a sequence of instructions under an eight-stage pipeline control. Each stage is processed in a machine cycle defined by a machine or system clock.

Attention will now be directed to a sequence of instructions A1, A2, ... A(i−1), Ai, A(i+1), ..., A(j−1), Aj, and so forth. Instructions of the sequence may successively be executed one after another along a stream of execution. It will be assumed that the sequence includes a first partial sequence of instructions A1 through A(i−1), a second partial sequence of instructions Ai through A(j−1), and a third partial sequence of instructions Aj and others. In the instruction memory 31 illustrated in FIG. 1, the instructions A1 through Aj and so on of the sequence are memorized in successive instruction addresses, respectively.

It may become necessary to execute the first partial sequence and immediately thereafter the third partial sequence. It is possible in this event to understand that the third partial sequence is a branch of the stream of execution. The instruction Aj is called a branch destination or target instruction and is said to be on a "go" to branch side. The stream is said to be directed to the "go" to branch side or in a "go" to branch direction. The instruction Ai is named a next instruction for discrimination from the branch destination instruction and is said to be on a "no go" to branch side. The stream continues to the "no go" to branch side or in a "no go" to branch direction if the instruction A(i−1) should next be followed by the instruction Ai rather than by the instruction Aj. When the stream should be directed to the branch, a branch instruction BC is used as an instruction of the first partial sequence. The instruction address of the branch destination instruction is called a branch destination address. The instruction address of the next instruction is termed a next instruction address. The next instruction and the branch destination instruction are herein called subsequent instruction.

It may alternatively become necessary to execute the first partial sequence, the second partial sequence a predetermined number of times, and then the third partial sequence. It is possible in this alternative case to understand that the second partial sequence is a branch. The second partial sequence is alternatively called a loop. After executed the predetermined number of times, the loop is left. At any rate, the instruction Ai is a branch destination instruction on a "go" to branch side. The instruction Aj is a next instruction on a "no go" to branch side. The branch instruction BC is referred to herein as a branch count instruction (branch on count instruction) BCT.

The first-mentioned branch instruction BC may indicate either the "go" to branch direction or the "no go" to branch direction depending on a branch condition or a condition for branch. The branch instruction is herein termed a conditional or conditioned branch instruction (branch on condition instruction) CB. If the branch condition is preliminary known prior to execution of the conditional branch instruction CB, the branch instruction is either an unconditional or nonconditioned branch instruction UB or is no larger a branch instruction. It is therefore possible for a conditional branch instructions CB to understand that the branch condition is known after the branch instruction in question is processed in the executing stage.

It may be mentioned here that each instruction comprises an operation code and a field which can be understood to indicate either an instruction address or at least one operand address. The field will herein be named an address field. A branch instruction BC may have an address field that indicates a branch destination address. When such a branch instruction is decoded by the instruction decoding circuit 36, the address field is used in generating a logical branch destination address. This fact is indicated in FIG. 2 by a line 40. The instruction address translating circuit 33 translates the logical branch destination address into a real branch destination address.

In FIG. 1, the data processing system comprises an instruction address register 41 in which request addresses are set one at a time as a current request address, through a request address selector 42 in the manner which will later be described in detail. Accessed by each current request address, the instruction memory 31 produces an instruction word. It will presumed merely for convenience of description that each instruction word is eight bytes long.

Figure 3:
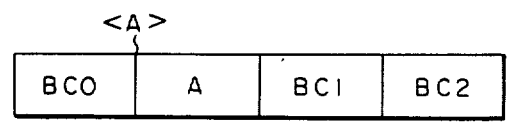
FIG. 3 exemplifies an instruction word used in the data processing system illustrated in FIG. 1.

Referring to FIG. 3, each instruction word usually consists of a plurality of instructions. In the example being illustrated, the instruction word consists of four two-byte instructions BC0, A, BC1, and BC2. In the manner which will later become clear, the instructions may have different instruction bit lengths.

Referring to FIG. 1, the instruction words are successively read out of the instruction memory 31 and are temporarily stored in an instruction buffer 43 as a queue of at least one instruction. In the manner known in the art, an instruction aligner 44 delivers one instruction at a time as a current instruction from the instruction buffer 43 to the instruction decoding circuit 36. Only when the instruction buffer 43 is empty, does the instruction aligner 44 supply the instruction decoding circuit 36 with an instruction of an instruction word which is currently read from the instruction memory 31.

A request address adder 45 is for adding eight to the current request address supplied from the instruction address register 41 to provide a next request address which is delivered to the request address selector 42 as a first one of seven input signals thereof. When selected by the request address selector 42 in the manner which will later be described, the next request address is substituted in the instruction address register 41, as a new current request address, for a previous request address which was used prior to the new current request address as the current request address. Such current request addresses are used in prefetching at least one instruction from the instruction memory 31 to form the queue in the instruction buffer 43. Incidentally, the request address adder 45 delivers a page over signal to the instruction address generating circuit 32. If desired, reference should be made to the page over signal discussions in the Hanatani et al patent application and the elder patent application which were cited heretobefore. A signal representative of the next request address will be called a "no go" to branch address signal for the reason which will later become clear.

According to the embodiment being illustrated, the instruction prefetching device comprises a branch history table (BHT) 46. In the manner which will become clear as the description proceeds, the branch history table 46 is retrieved by the current request address supplied from the instruction address register 41 to produce branch information if the instruction word currently read from the instruction memory 31 comprises a branch instruction which was ever actually executed, namely, if the current request address comprises a branch instruction address of such a branch instruction. Structure and operation of the branch history table 46 are described in greater detail in the Hanatani et al patent application and the elder patent application. The branch history table 46 will therefore be described only briefly in the following.

Figure 4:
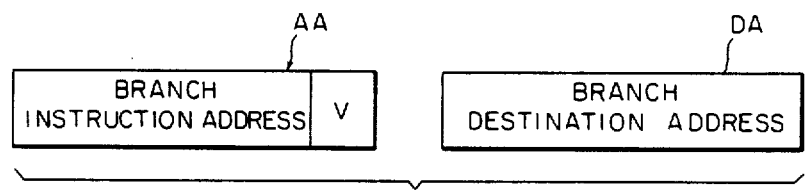
FIG. 4 shows a pair of entries in a branch history table which is used in the instruction prefetching device depicted in FIG. 1.

Referring to FIG. 4, the branch history table 46 (FIG. 1) is for memorizing a plurality of entry pairs which will later be illustrated. Each entry pair consists of a first or address entry AA and a second or data entry DA. The first and the second entries therefore correspond to each other when the first and the second entries are in one of the pairs. The first entries give address information. The second entries give the branch information mentioned above. More particularly, the first entry of a pair gives a branch instruction address of a branch instruction which was ever executed and which gave a branch destination address. The second entry of the pair under consideration gives a result, such as the branch destination address, which was obtained by actual execution of the branch instruction having the branch instruction address in the corresponding first entry.

More specifically, the branch information of each second entry comprises a validity flag V and a branch destination address which were obtained by actual execution of the branch instruction having the branch instruction address in the corresponding first entry. The validity flag may be on a one-bit flag and will therefore be referred to alternatively as a validity bit. The validity flag or bit V indicates validity of the branch information, namely, the fact that the branch information can be used as predicted branch information in predicting a result of actual execution of the branch instruction which is currently prefetched. For this purpose, the validity bit V is given one of two logic values or levels, typically, a logic one value or level. In other words, the validity bit V of the logic one value indicates the "go" to branch side or direction as a predicted branch direction (with sense) and the accompanying branch destination address as a predicted destination address.

The branch instruction address and the branch destination address are preferably real addresses. it should be noted in connection with FIG. 4 that the validity bit V is depicted contiguous to the real branch instruction address as if a part of the first entry AA rather than contiguous to the real branch destination address as part of the second entry DA. This is merely for convenience in practice.

Referring back to FIG. 1, the instruction prefetching device comprises an instruction prefetch control circuit 47 which will be described as the description proceeds. It will be presumed that the current request address comprises a branch instruction address of a branch instruction BC. In the manner described in detail in the Hanatani et al Patent application or in the elder patent application, the current request address is used in checking whether or not the branch instruction address is memorized in the branch history table 46. If the branch instruction address is present, the branch history table 46 delivers the validity bit V to the instruction prefetch control circuit 47 as an address hit signal. In other words, the address hit signal is given the logic one value in this event. If the branch instruction address is absent, the branch history table 46 holds no branch information for the branch instruction BC, the address hit signal is given a logic zero value or level. The address hit signal has the logic zero value also when each instruction address of the current request address is either for an instruction other than branch instructions or for a branch instruction which has never been actually executed. The logic zero value of the address hit signal indicates that the stream of execution should not be directed to the branch but to the "no go" to branch side even if the current instruction is a branch instruction and will indicate the "go" to branch direction when actually executed.

In this manner, the address hit signal is delivered to the instruction prefetch control circuit 47 with either the logic one or the logic zero value as a first one of six input signals thereof to indicate the predicted branch direction as a branch direction predicting signal. It is therefore possible to understand that the branch history table 46 may memorize the validity bit V of the logic zero value when the "no" to branch direction should be indicated by an instruction which may be either a branch instruction or an instruction other than the branch instructions. In this event, the branch history table 46 produces the address hit signal of the logic zero value when the current request address does not comprise an instruction address of a branch instruction which was ever executed. When the validity bit V has the logic zero value, the accompanying branch destination address is void, namely, is not used in predicting a branch destination address.

A branch information buffer 48 has an address information field and a branch information field which are partitioned in FIG. 1 by a thin vertical line. Concurrently with accumulation of the instruction words in the instruction buffer 43 as the queue of instructions in response to successive request addresses, an instruction address included in the current request address for each instruction is delivered from the instruction address register 31 and is accumulated in the address information field of the branch information buffer 48. The logic one and the logic zero values indicated by the address hit signal are simultaneously delivered to the branch information buffer 48 and are accumulated in the branch information field. Each time the address hit signal has the logic one value, the branch destination address is delivered from the branch history table 46 to the branch information buffer 48 and is accumulated in the branch information field along with the logic one validity bit V. When the address hit signal has the logic zero value, only the instruction address and the logic zero validity bit V are accumulated in the branch information buffer 48.

A branch destination predicting signal representative of such predicted destination addresses will be called a "go" to branch address signal and is delivered to the request address selector 42 from the branch history table 46 as a second one of the seven input signals. When a "go" to branch address is set in the instruction address register 41 in the manner which will later be described, the instruction memory 31 produces an instruction word which comprises the branch destination instruction. It should be understood as regards FIG. 1 that the branch history table 46 is depicted as if only the branch information with the address information field depicted as a part of a branch history table retrieving arrangement by a signal line which starts at the instruction address register 41 and ends at the branch history table 46.

Figure 5:
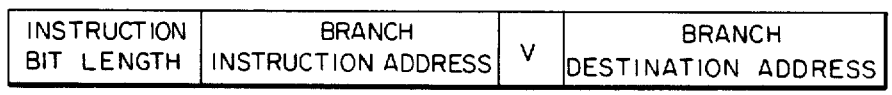
FIG. 5 shows an entry in a branch information register which is used in the instruction prefetching device illustrated in FIG. 1.

Turning to FIG. 5, it will be surmised throughout the following that the branch instruction and the branch destination addresses are real addresses. When the validity bit V has the logic one value, the branch instruction address, the validity bit V, and the predicted destination address are stored in the branch information buffer 48. When the validity bit V has the logic zero value, only the instruction address and the validity bit V are stored in the branch information buffer 48 in the manner described above. Even in this event, the predicted destination address may also be stored in the branch information buffer 48. The predicted destination address is, however, void as pointed out earlier. Although depicted in FIG. 5, the instruction bit length is not yet known and is not stored in the branch information buffer 48.

Referring to FIG. 1, a branch information switch 49 corresponds to the instruction aligner 44 in the manner which will presently be described. First through fifth branch information registers 51, 52, 53, 54, and 55 are used for the purposes which will become clear as the description proceeds. Each of the branch information registers 51 through 55 has an address information field and a branch information field like the branch information buffer 48. The address information field of the first branch information register 51 is for the instruction address alone. The address information field of each of the second through the fifth branch information registers 52 to 55 is for the instruction bit length depicted in FIG. 5 and for the instruction address. The branch information field of each of the first through the fifth branch information registers 51 to 55 is for the validity bit V and the predicted destination address.

Simultaneously with delivery of the current instruction from the instruction buffer 43 to the instruction decoding circuit 36 by the instruction aligner 44, the branch information switch 49 delivers the instruction address, the validity bit V, and the predicted destination address for the current instruction from the branch information buffer 48 to the first branch information register 51. When the instruction buffer 43 and consequently the branch information buffer 48 is empty, the branch information switch 49 supplies the first branch information register 51 with the instruction address of the current instruction directly from the instruction address register 41 and the validity bit V and the predicted destination address directly from the branch history table 46. In this manner, the first branch information register 51 is loaded with the instruction address, the validity bit V, and the predicted destination address for the current instruction processed in the instruction decoding stage by the instruction decoding circuit 36.

The instruction decoding circuit 36 decodes the current instruction and delivers the instruction bit length to the second branch information register 52. In the meantime, the content of the first branch information register 51 is transferred to the second branch information register 52. The current instruction is thereafter processed in the operand address generating stage by the operand address generating circuit 37.

When the current instruction is processed in the operand address translating stage by the operand address translating circuit 38, the content of the second branch information register 52 is transferred to the third branch information register 53. If the current instruction is a branch instruction BC, the instruction address translating circuit 33 produces in this stage a "go" to branch destination signals representative of a "go" to branch destination address.

The instruction address translating circuit 33 may moreover produce a "go" to branch direction signal indicative of a "go" to branch direction. If the current instruction is not a branch instruction BC, the instruction address translating circuit 33 may produce a "no go" to branch direction signal indicative of a "no go" to branch direction. The "go" to and the "no go" to branch directions may be called a decoded branch direction. The "go" to branch destination address may be named a decoded destination address.

When the current instruction is processed in the operand reading stage by the operand reading circuit 49, only the address information and the validity bit V of the third branch information register 53 are transferred to the fourth branch information register 54. The "go" to branch destination address is substituted in the fourth branch information register 54 for the predicted destination address of the third branch information register 53. The "go" to branch destination address is newly used as a predicted destination address. When the current instruction is processed in the executing stage by the instruction executing unit 35, the content of the fourth branch information register 54 is transferred to the fifth branch information register 55.

It is possible that the decoded branch direction is used in the fourth branch information register 54 instead of the validity bit produced by the branch history table 46 as a predicted branch direction and is moved to the third branch information register 53. In this event, the decoded branch direction is afresh used as a predicted branch direction. It will, however, be presumed in the following that the decoded branch direction is not used in the fourth branch information register 54.

First through third instruction address adders 56, 57, and 58 are coupled to the address information fields of the second, the third, and the fifth branch information registers 52, 53, and 55, respectively. Each of the instruction address adders 56 through 58 is for calculating a sum of the instruction bit length of the current instruction and the instruction address of the current instruction to derive a next instruction address of a next instruction which next follows the current instruction on the "no go" to branch side. The next instruction may be in the instruction word which includes the current instruction. Alternatively, the next instruction may be in a next instruction word which next follows the current instruction.

The first instruction address adder 56 delivers the next instruction address to the request address selector 42 as a third one of the seven input signals. The next instruction address is represented as a first corrected address in a first corrected address signal delivered to the request address selector 42.

It is now understood that the instruction executing circuit can execute a sequence of instructions memorized in the instruction memory 31. Each instruction is processed successively in a plurality of stages as a current instruction, each stage in a machine cycle defined by the machine clock. The stages include an executing stage processed by the instruction executing unit 35. By using the instruction address register 41 and the request address adder 45, the instruction prefetching device carries out prefetch of at least one instruction from the sequence.

A combination of the branch history table 46 and the first through the fifth branch information registers 51 to 55 serves as a predicting arrangement or circuit. Responsive to an instruction address set in the instruction address register 41 for the prefetch, the predicting arrangement produces branch information. An instruction having the instruction address under consideration, is herein called a particular instruction merely for discrimination from other instructions of the sequence. The branch information is what was obtained when and if the particular instruction was ever processed in the executing stage. The particular instruction is used as the current instruction when delivered to the instruction decoding circuit 36.

In the manner which will later become clear, the branch information is updated or renewed in the branch history table 46 depending on the circumstances. More specifically, the branch information may be updated in one of the second entries DA with the address information AA untouched in the corresponding first entry. As the case may be, the address information is deleted from one of the first entries together with the branch information in the corresponding second entry. The branch information should therefore be understood as a result which was obtained next prior to prefetch of the particular instruction. The branch information is produced as predicted branch information in the manner described earlier.

In FIG. 1, an address recover register 61 delivers its content to the request address selector 42 as a fourth one of the seven input signals and is accompanied by an address recover selector 62 in the manner described in the Hanatani et al patent application. The next request address of the request address adder 45, the branch destination predicting signal, and the first corrected address of the first instruction address adder 56 are delivered to the address recover selector 62 as the first through third of six input signals thereof. A selected address register 63 delivers its content to the branch history table 46. The selected address register 63 is not different from the destination address register as referred to in the Hanatani et al patent application and in the elder patent application and will be described later in the following.

In the example being illustrated, the instruction prefetching device comprises a first or operand address generating stage prediction checking or evaluating circuit 66, a second or operand address translating stage prediction checking circuit 67, a third or operand reading stage prediction checking circuit 68, and a fourth or executing stage prediction checking circuit 69. A first flip-flop circuit 71 is used between the first prediction checking circuit 66 and the second prediction checking circuit 67. Second and third flip-flop circuits 72 and 73 are used between the second and the third prediction checking circuits 67 and 68. Fourth and fifth flip-flop circuits 74 and 75 are interposed between the third and the fourth prediction checking circuits 68 and 69. A sixth flip-flop circuit 76 is connected between the fourth prediction checking circuit 69 and the branch history table 46. Each flip-flop circuit is used in holding a signal supplied thereto during one machine cycle.

In the manner which will become clear as the description proceeds, the first through the fourth prediction checking circuits 66 to 69 are used either singly or in any combination as a prediction checking arrangement together with the first flip-flop circuit 71 for the second prediction checking circuit, the second and the third flop-flop circuits 72 and 73 for the second prediction checking circuit, and the fourth and the fifth flip-flop circuits 74 and 75 for the fourth prediction checking circuit. Only the sixth flip-flop circuit 76 should be understood as a part of an instruction prefetch controlling arrangement which includes the instruction prefetch control circuit 47 as a main element and will later be discussed.

When supplied with the current instruction from the instruction aligner 44, the instruction decoding circuit 36 decodes the current instruction. In accordance with the current instruction, the instruction decoding circuit 36 delivers the instruction bit length to the second branch information register 52 in the manner described hereinabove. The instruction decoding circuit 36 furthermore delivers a first discrimination signal to the first prediction checking circuit 66 as a first one of two input signals thereof through a first signal line 81 and a second discrimination signal through a second signal line 82 to an intermediate register 83 and then to the second prediction checking circuit 67 as a first one of four input signals thereof.

The first discrimination signal indicates whether or not the current instruction is a branch instruction BC which may be either of a branch count instruction BCT, an unconditional branch instruction UB, or a conditional branch instruction CB. The second discrimination signal indicates whether or not the branch instruction BC is either a branch count instruction or an unconditional branch instruction. Typically, the first discrimination signal has the logic one value or level when the current instruction is a branch instruction. Otherwise, the first discrimination signal has the logic zero value. The second discrimination signal has the logic one value when the current instruction is either a branch count instruction or an unconditional branch instruction. The second discrimination signal has the logic zero value when the current instruction is either a conditional branch instruction or an instruction other than the branch instructions. For a branch count instruction, the second discrimination signal of the logic one value is equivalent to the BCT bit described in the elder patent application.

The first prediction checking circuit 66 is coupled to the first branch information register 51 and to the instruction decoding circuit 36 to carry out a check, immediately after the instruction decoding stage for the current instruction, as regards to the predicted branch information is correct or incorrect in view of actual branch information which is obtained for the current instruction in the instruction decoding stage. More particularly, the actual branch information is in this event an actual branch direction (with sense) indicative of one of a "go" to branch direction and a "no go" to branch direction when the current instruction is a branch instruction and is not, respectively. The first prediction checking circuit 66 checks the predicted branch direction to produce a result of check which represents whether the predicted branch direction is correct or incorrect.

For this purpose, the validity bit V is delivered from the first branch information register 51 to the first prediction checking circuit 66 as a second one of the two input signals that indicates the predicted branch direction. The first prediction checking circuit 66 delivers a first prediction error or failure signal representative of the result of check to the instruction prefetch control circuit 47 as a second one of the six input signals and to the first flip-flop circuit 71.

In the example being illustrated, the first prediction error signal has the logic one value or level when the validity bit V has the logic one value in the first branch information register 51 in contradiction to the fact that the current instruction is not a branch instruction BC. Otherwise, the first prediction error signal has the logic zero value and indicates correctness of the predicted branch direction for the current instruction. In the manner which will later become clear, the first prediction error signal is used by the instruction prefetch control circuit 47 as a first prefetch correcting signal and is later used as a first BHT (branch history table) renewal or updating signal.

It may be mentioned here that each instruction specifies one or more general purpose registers (GR, not shown). Each general purpose register holds a count in the manner known in the art. As described in the elder patent application, the count represents at first the above-mentioned predetermined number of times of repeated execution of instructions along a loop when the general purpose register is specified by a branch count instruction BCT. One is subtracted from the count each time the loop is executed. Before the count is reduced to unity, the loop should repeatedly be executed. When the count is reduced to zerox, the loop should be left. For a branch count instruction BCT, the count will be referred to specifically as a variable count.

Inasmuch as the variable count is kept in the general purpose register for a branch count instruction BCT while the loop is once executed, it is possible to understand that the operand address generating circuit 37 delivers the variable count to a count line 84 and thence to a comparator 85 and that the count line 84 symbolically represents a general purpose register specified by a branch count instruction BCT. In the manner discussed in the elder patent application, it is desirable to treat a branch count instruction BCT as if the instruction BCT indicates the "no go" to branch direction when the variable count becomes equal to unity.

The comparator 85 compares the variable count with unity to supply the second prediction checking circuit 67 with a count one signal as a second one of the four input signals. The count one signal typically has the logic one value when the variable count is equal to unity. The count one signal otherwise has the logic zero value and is therefore equivalent to the count one signal described in the elder patent application.

The second prediction checking circuit 67 is coupled to the second branch information register 52, to the instruction decoding circuit 36 through the intermediate register 83, and to the operand address generating circuit 37 through the comparator 85 to carry out a check for each unconditional branch instruction UB or for each branch count instruction BCT immediately after the current instruction is processed in the operand address generating stage. It is possible to carry out the check for the unconditional branch instruction immediately after the current instruction is processed in the instruction decoding stage. For this purpose, the first prediction checking circuit 66 may be modified so as to use the validity bit V of the first branch information register 51 and the actual branch direction of the instruction decoding circuit 36 as the above-mentioned second and first of the two input signals, repectively. It is nevertheless preferred that the check should be carried out even for the unconditional branch instruction immediately after the operand address generating stage for the reason which will become clear from the following.

For each unconditional branch instructions UB which always indicates the "go" to branch direction as the actual branch direction, a combination of the instruction decoding circuit 36 and the intermediate register 83 produces a consequence of the logic one value when the unconditional branch instruction is processed in the operand address generating stage. For instructions other than such unconditional branch instructions, the actual branch direction may or may not indicate the "go" to branch direction. In any event, the predicted branch direction of the "no go" to branch direction is an incorrect branch direction for an unconditional branch instruction. Responsive to the consequence, the second prediction checking circuit 67 carries out the check as regards the predicted branch direction to produce a result of check which represents whether the predicted branch direction is correct or incorrect. Depending on the circumstances, the intermediate register 83 and the comparator 85 should be understood as parts of the second prediction checking circuit 67.

When processed in the operand address generating stage, the current instruction produces the second discrimination signal of the logic one value through the intermediate register 83 as a consequence when the current instruction is a branch count instruction BCT. For a branch count instruction BCT, the consequence should indicate the "go" to branch direction as the actual branch direction unless the variable count is equal to unity. The consequence should indicate the "no go" to branch direction as the actual branch direction when the variable count is specifically equal to unity.

Responsive to the consequence and the variable count for a branch count instruction BCT, the second prediction checking circuit 67 produces a result of check which represents whether or not the predicted branch direction indicates the "no go" to branch direction in contradiction to the actual branch direction of the "go" to branch direction when the variable count is not equal to unity. The result of check represents for the branch count instruction BCT whether or not the predicted branch direction is the "go" to branch direction in controversy to the actual branch direction of the "no go" to branch direction when the variable count is specifically equal to unity. Depending on the circumstances, the intermediate register 83 and the comparator 85 should be understood as parts of the second prediction checking circuit 67. The comparator 85 plays an important role for a branch count instruction.

In order to carry out the check for an unconditional branch instruction UB or a branch count instruction BCT, the second prediction checking circuit 67 is supplied with the validity bit V from the second branch information register 52 as a third one of the four input signals. When the validity bit V indicates the "no go" to branch direction irrespective of the fact that the predicted branch direction should be the "go" to branch direction either because the current instruction is an unconditional branch instruction UB or because the count one signal has the logic zero value for a branch count instruction BCT, the second prediction checking circuit 67 delivers the result of check as a second prediction error signal to the instruction prefetch control circuit 47 as a third one of the six input signals and furthermore delivers the result to the second flip-flop circuit 72.

If the predicted branch direction is the "no go" to branch direction for an unconditional branch instruction UB or for a branch count instruction BCT for which the variable count is not equal to unity, the second prediction checking circuit 67 delivers a second prefetch correcting signal to the third flip-flop circuit 73 and to a first instruction address selector 86. Under the respective circumstances, the second prediction error signal and the second prefetch correcting signal have the logic one value. Otherwise, the second prediction error signal and the second prefetch correcting signal have the logic zero value. It should be noted that the second prefetch correcting signal has the logic zero value even when the predicted branch direction is the "go" to branch direction for a branch count instruction BCT for which the variable count is specifically equal to unity.

The first instruction address selector 86 is supplied with the "go" to branch destination address from the instruction address translating circuit 33 and with the next instruction address from the second instruction address adder 57. When the second prefetch correcting signal has the logic one value, the first instruction address selector 86 delivers the "go" to branch destination address of the instruction address translating circuit 33 to the request address selector 42 as a fifth one of the seven input signals and to the address recover register 62 as a fourth one of the six input signals. When the second prefetch correcting signal has the logic zero value, the first instruction address selector 86 delivers the next instruction address of the second instruction address adder 57 to the request address selector 42 as the fifth one of the seven input signals and to the address recover register 62 as the fourth one of the six input signals.

Selected by the first instruction address selector 86 in this manner, a second corrected address is represented by a second corrected address signal delivered to the request address selector 42 and to the address recover register 62. It should be noted that the second prefetch correcting signal is produced with the logic one value for each unconditional branch instruction when the predicted branch direction is incorrect. For each branch count instruction for which the variable count is not equal to unity, the second prefetch correcting signal is produced with the logic one value when the predicted branch direction is incorrect. Under the circumstances, the second corrected address is the "go" to branch destination address in the correct branch direction. For each branch count instruction for which the variable count is reduced to unity, the second prefetch correcting signal has the logic zero value when the predicted branch direction is incorrect. In this event, the second corrected address is the next instruction address in the correct branch direction.

It is convenient to understand that a fourth one of the four input signals of the second prediction checking circuit 67 is given by an output signal of the first flip-flop circuit 71 which holds the first prediction error signal, namely, the first prefetch correcting or BHT renewal signal. Responsive to the fourth input signal, the second prediction checking circuit 67 delivers a second BHT renewal signal to the second flip-flop circuit 72 with one of the two logic values that is had either by the first prediction error signal or the second prediction error signal.

Attention will be directed to a combination of the first and the second prediction checking circuits 66 and 67. In the manner described earlier, the first prediction checking circuit 66 corrects the prefetch for each instruction other than the branch instructions BC when the validity bit V has the logic one value. Also when the validity bit V has the logic one value, the second prediction checking circuit 67 corrects the prefetch for each branch count instruction BCT for which the variable count is specifically equal to unity and which should be treated as if an instruction other than the branch instructions. In other instances, the second prediction checking circuit 67 is activated or rendered operable either for each unconditional; branch instruction UB or for each branch count instruction BCT only when the validity bit V has the logic one value in the second branch information register 52.

The third prediction checking circuit 68 is coupled to the third branch information register 53 and the instruction address translating circuit 33. For the current instruction, the predicted branch direction and the predicted destination address are supplied to the third prediction checking circuit 68 as first and second ones of five input signals thereof. Merely for simplicity of illustration, only one signal line is depicted for these signals. The "go" to branch destination address is supplied as a third one of the five input signals. Either of the first and the second prediction error signals is supplied as a fourth one of the five input signals through the second flip-flop circuit 72.

In the manner which will later be described, the third prediction error circuit 68 delivers a third prediction error signal to the instruction prefetch control circuit 47 as a fourth one of the six input signals. A third BHT renewal signal is delivered to the fourth flip-flop circuit 74. It should be understood that the second flip-flop circuit 72 holds the logic one value when either the first or the second prediction error signals has the logic one value. The second flip-flop circuit 72 holds the logic zero value when neither the first nor the second prediction error signal has the logic one value.

The third prediction checking circuit 68 is activated for the third prediction error signal and the third BHT renewal signal when the validity bit V has the logic one value in the third branch information register 53 and furthermore when the first and the second prediction error signals have the logic zero value. If activated, the third prediction checking circuit 68 gives the logic one value to the third prediction error signal and to the third BHT renewal signal when the predicted destination address is different from the "go" to branch destination address. In this connection, it is possible to understand that the second flip-flop circuit 72 is used as a portion of the third prediction checking circuit 68.

The third flip-flop circuit 73 holds the second prefetch correcting signal which has the logic one value when the predicted branch direction is incorrect and furthermore when the predicted branch direction is corrected to the "go" to branch direction. The third prediction checking circuit 68 is supplied with the second prefetch correcting signal through the third flip-flop circuit 73 as a fifth one of the five input signals. The third prediction checking circuit 68 thereby delivers a third prefetch correcting signal to the fifth flip-flop circuit 75 with the logic one value either when the third prediction error signal and accordingly the third BHT renewal signal is given the logic one value or when the second prefetch correcting signal is given the logic one value. It is possible in this connection to understand that the third flip-flop circuit 73 is a part of the third prediction checking circuit 68.

It may be mentioned here that the request address selector 42 and the address recover selector 62 are supplied, as a sixth one of the seven input signals and as a fifth one of the six input signals, respectively, with the "go" to branch destination address held in the fourth branch information register 54 for the current instruction which is processed in the operand reading stage by the operand reading circuit 39. As a seventh one of the seven input signals, the request address selector 42 is supplied with the instruction address held in the fifth branch information register 55 for the current instruction processed in the executing stage. The "go" to branch destination address will be called a third corrected address in this event and is used in correcting the predicted destination address of the "no go" to branch direction to the "go" to branch destination address in response to the third prediction error signal in the manner which will later become clear.

It will hereafter be presumed that the branch condition becomes clear for a branch instruction BC, typically a conditional branch instruction CB, when the executing stage is carried out by the instruction executing unit 35 for the branch instruction under consideration. Processing the branch instruction as the current instruction, the instruction executing unit 35 produces a branch indicating signal with the logic one value when the stream of execution should be directed to the branch, namely, to the "go" to branch side. The branch indicating signal has the logic zero value when the stream of execution should not be directed to the branch, namely, when the stream should be directed to the "no go" to branch direction.

The third instruction address adder 58 supplies a second instruction address selector 87 with a next instruction address for the current instruction which is processed in the executing stage. From the branch information field of the fifth branch information register 55, the second instruction address selector 87 is supplied with a signal which represents the "go" to branch destination address for the current instruction under consideration. It may be mentioned here that the "go" to branch destination address does not necessarily give an instruction address of an instruction to which the stream of execution should be directed. Such case results if the current instruction gives the "no go" to branch direction when processed in the executing stage to give the above-mentioned branch condition. Controlled by the branch indicating signal, the second instruction address selector 87 delivers a fourth corrected address to the address recover selector 62 as a sixth one of the six input signals and to the selected address register 63. The fourth corrected address will alternatively be called a selected address. When the branch indicating signal has the logic one value, the "go" to branch destination address is selected as the selected address. When the branch indicating signal has the logic zero value, the selected address is given by the next instruction address.

The fourth prediction checking circuit 69 is coupled to the fourth branch information register 54 and to the instruction executing unit 35 and is supplied with the validity bit V from the fourth branch information register 54 as a first one of four input signals thereof. The branch indicating signal is supplied from the instruction executing unit 35 as a second one of the four input signals. The fourth flip-flop circuit 75 holds at least one of the first through the third prediction error signals that is supplied as a third one of the four input signals. The fifth flip-flop circuit 75 holds either of the second and the third prefetch correcting signals and supplies the fourth prediction checking circuit 69 with a fourth one of the four input signals.

In the manner which will later be described, the fourth prediction checking circuit 69 delivers a fourth prediction error signal to the instruction prefetch control circuit 47 as a fifth one of the six input signals and a fourth BHT renewal signal to the instruction prefetch control circuit 47 as a sixth one of the six input signals and to the sixth flip-flop circuit 76. It will be presumed for the time being that none of the first through the third prediction error signals and the second and the third prefetch correcting signals is produced. When the branch indicating signal indicates the "no go" to or the "go" to branch direction in contradiction to the validity bit V held in the fourth branch information register 54, the logic one value is given to the fourth prediction error signal and to the fourth BHT renewal signal.

It may be pointed out here that the second BHT renewal signal has the same logic value as the second prediction error signal and that the third BHT renewal signal has the same logic value as the third prediction error signal. It is therefore possible to understand that the sixth flip-flop circuit 76 holds a BHT renewal indicating signal of the logic one value when at least one of the first through the fourth BHT renewal signals has the logic one value.

The fourth prediction checking circuit 69 is similar to the prediction evaluating circuit described in the Hanatani et al patent application or in the elder patent application. The branch indicating signal is equivalent to the actual branch direction signal and indicates an actual branch direction which is obtained when the current instruction is processed in the executing stage by the instruction executing unit 35. The BHT renewal indicating signal is equivalent to the prediction evaluating signal described in the elder patent application. The fourth prediction checking circuit 69 is, however, responsive to the first through the third prediction error signals and the second and third prefetch correcting signals and checks the predicted branch direction in view of the actual branch direction. It is possible in these respects to understand that the fourth and the fifth flip-flop circuits 74 and 75 are used as parts of the fourth prediction checking circuit 69.

Figure 6:
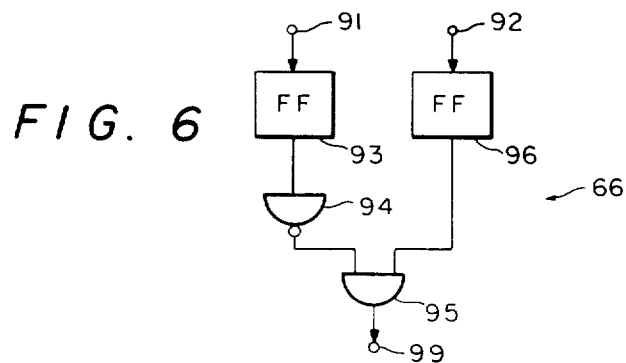
FIG. 6 is a block diagram of a first prediction checking circuit for use in the instruction prefetching device depicted in FIG. 1.

Referring now to FIG. 6, the first prediction checking circuit 66 has first and second input terminals 91 and 92 which are supplied with the first discrimination signal from the instruction decoding circuit 36 and the validity bit V from the first branch information register 51. through a flip-flop circuit 93, the first input terminal 91 is connected to a NOT circuit 94 for delivering its output to a first input of a two-input AND circuit 95 which has a second input connected to the second input terminal 92 through another flip-flop circuit 96. The AND circuit 95 delivers its output to an output terminal 99 of the first prediction checking circuit 66. It will readily be appreciated that the first prediction checking circuit 66 is operable in the manner described above and will later be described again.

Figure 7:
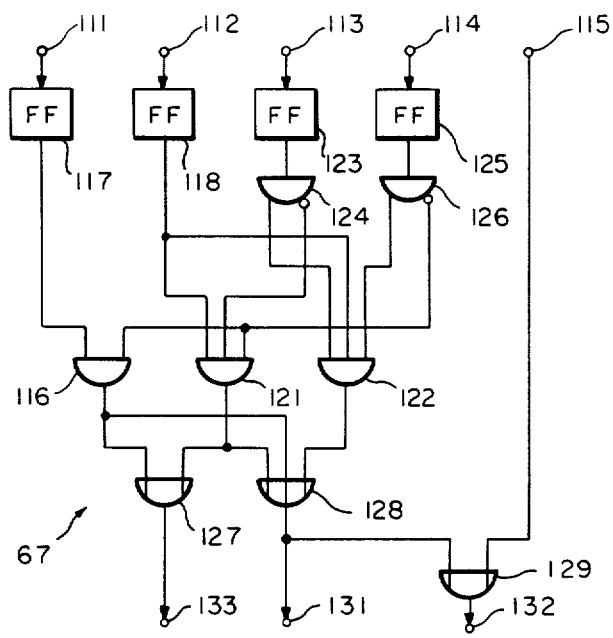
FIG. 7 is a block diagram of a second prediction checking circuit for use in the instruction prefetching device depicted in FIG. 1.

Turning to FIG. 7, the second prediction checking circuit 67 has first and second input terminals 111 and 112 which are supplied in common with the second discrimination signal through the intermediate register 83 and which are separately depicted for convenience of understanding the second prediction checking circuit 67 as consisting of an unconditional branch instruction part and a branch count instruction part. As the branch count instruction part, a third input terminal 113 is supplied with the count one signal from the comparator 85. As a common part which is shared by the unconditional branch and the branch count instruction parts, a fourth input terminal 114 is supplied with the validity bit V from the second branch information register 52. As an additional part, a fifth input terminal 115 is supplied with an output of the first flip-flop circuit 71.

The first input terminal 111 is connected to a first input of a two-input AND circuit 116 through a flip-flop circuit 117. Through another flip-flop circuit 118, the second input terminal 112 is connected to a first input of a first three-input AND circuit 121 and to a first input of a second three-input AND circuit 122.

Through a flip-flop circuit 123, the third input terminal 113 is connected to a count truth-false circuit (single-input AND/NAND circuit) 124 which delivers its truth output to a second input of the second three-input AND circuit 122 and its false or inverted output to a second input of the first three-input AND circuit 121. Through another flip-flop circuit 125, the fourth input terminal 114 is connected to a validity truth-false circuit 126 which delivers its truth output to a third input of the second three-input AND circuit 122 and its false output to a third input of the first three-input AND circuit 121.

For use in common by the unconditional branch and the branch count instruction parts, a two-input OR circuit 127 receives outputs of the two-input AND circuit 116 and the first three-input AND circuit 121. A three-input OR circuit 128 receives outputs of the two-input AND circuit 116 and the first and the second three-input AND circuits 121 and 122. The fifth input terminal 115 is connected directly to another two-input OR circuit 129 which is supplied with an output of the three-input OR circuit 128.

The second prediction checking circuit 67 has first through third output terminals 131, 132 and 133 which are supplied with the output of the three-input OR circuit 128 as the second prediction error signal, an output of the two-input OR circuit 129 as the second BHT renewal signal, and an output of the OR circuit 127 as the second prefetch correcting signal. It will readily be appreciated that the unconditional branch instruction part is operable in cooperation with the common part in the manner described above. The branch count instruction part is likewise operable as described above.

Figure 8:
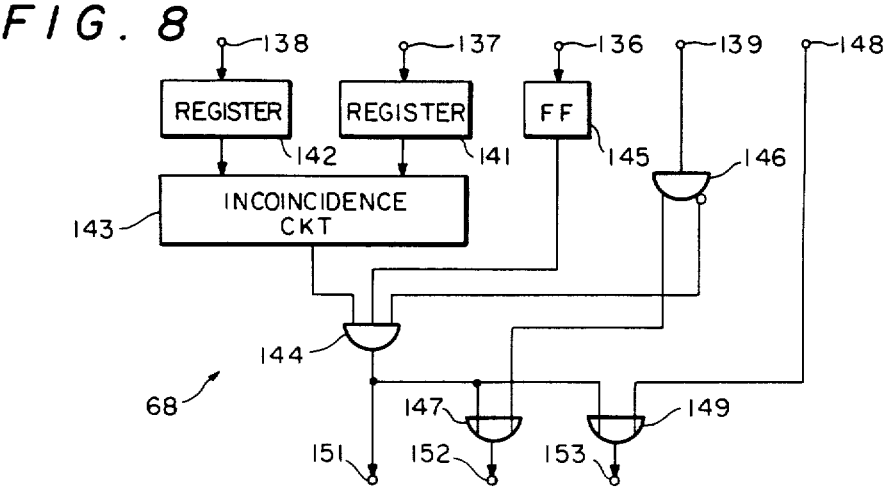
FIG. 8 is a block diagram of a third prediction checking circuit for use in the instruction prefetching device depicted in FIG. 1.

Further turning to FIG. 8, the third prediction checking circuit 68 has first through fourth input terminals 136, 137, 138, and 139 which are supplied with the validity bit V and the predicted destination address from the third branch information register 53, the "go" to branch destination address from the instruction address translating circuit 33, and an output of the second flip-flop circuit 72, respectively. Through registers 141 and 142, the predicted destination address and the "go" to branch destination address are delivered to an incoincidence circuit 143 for delivering its output to a first input terminal of a three-input AND circuit 144 which has a second input terminal supplied with the validity bit V through a flip-flop circuit 145 and a third input terminal supplied with a false output produced by a truth-false circuit 146 in response to the output of the second flip-flop circuit 72. A two-input OR circuit 147 is supplied with an output of the AND circuit 144 and a truth output of the truth-false circuit 146.

An additional input terminal 148 delivers an output of the third flip-flop circuit 73 directly to another two-input OR circuit 149 which is supplied with the output of the AND circuit 144. The third prediction checking circuit 68 has first through third output terminals 151, 152, and 153 which are supplied with the output of the AND circuit 144 as the third prediction error signal, an output of the OR circuit 147 as the third BHT renewal signal, and an output of the OR circuit 149 as the third prefetch correcting signal. It will readily be appreciated that the third prediction checking circuit 68 is operable in the manner described above.

Attention will be directed to operation of the third prediction checking circuit 68 in more detail. It is possible to understand that the third prediction checking circuit 68 comprises a first and a second part. It will be understood that the instruction decoding circuit 36 produces the first and the second discrimination signals collectively as a consequence indicative of whether the current instruction indicates the next instruction or the branch destination instruction. When the branch destination instruction is processed in the instruction address translating stage concurrently when the current instruction is processed in the operand address translating stage, the instruction address translating circuit 33 produces the "go" to branch destination address. The predicted branch information comprises the predicted branch direction for the next instruction or the branch destination instruction and the predicted destination address for each branch destination instruction. On the other hand it is possible to understand that the three-input AND circuit 144 consists of a first and a second two-input AND gate which are depicted by two signal leads for the validity bit V and the false output and by a combination of the first AND gate and a signal lead between the incoincidence circuit 143 and the three-input AND circuit 144.

The first part is a combination of the first two-input AND gate and the second prediction checking circuit 67 and is operable immediately after the current instruction is processed in the operand address generating stage and then immediately after the current instruction is processed in the operand address translating stage. Alternatively, the first part is a combination of the first two-input AND gate, the second prediction checking circuit 67, and the second flip-flop circuit 72 and is operable immediately after the current instruction is processed in the operand address translating stage. In either event, the second prediction checking circuit 67 should be understood as including the first prediction checking circuit 66.

Responsive to the consequence indicative of either the "go" to branch direction or the "no go" to branch direction, the first part checks the predicted branch direction to produce a first and a second result of check. Produced by the first prediction checking circuit 66 and by the second prediction checking circuit 67 for a branch count instruction BCT when the variable count is reduced to unity, the first result represents whether or not the predicted branch direction indicates the "go" to branch direction for the current instruction which is not a branch instruction BC and indicates the next instruction in the "no go" to branch direction. Produced by the first two-input AND gate and by the second prediction checking circuit 67 either for an unconditional branch instruction UB or when the variable count is not equal to unity, the second result represents whether or not the predicted branch direction indicates the "no go" to branch direction for the current instruction which is a branch instruction BC and indicates the branch destination instruction in the "go" to branch direction.

The second part comprises a combination of the incoincidence circuit 143 and the second two-input AND gate and is operable immediately after the current instruction is processed in the operand address translating stage. Responsive to the first and the second results and to the "go" to branch destination address indicated by the decoded destination address, the second part checks the predicted destination address to produce a third result of check which represents whether the predicted destination address is incoincident or coincident with the "go" to branch destination address if the first result does not represent the "go" to branch direction as the predicted branch direction because the current instruction indicates the next instruction and if the second result does not represent the "no go" to branch direction as the predicted branch direction because the current instruction indicates the branch destination instruction. The second part is quiescent if the first result represents the "no go" to branch direction as the predicted branch direction for the current instruction indicative of the branch destination instruction and if the second result represents the "go" to branch direction as the predicted branch direction for the current instruction indicative of the next instruction.

Figure 9:
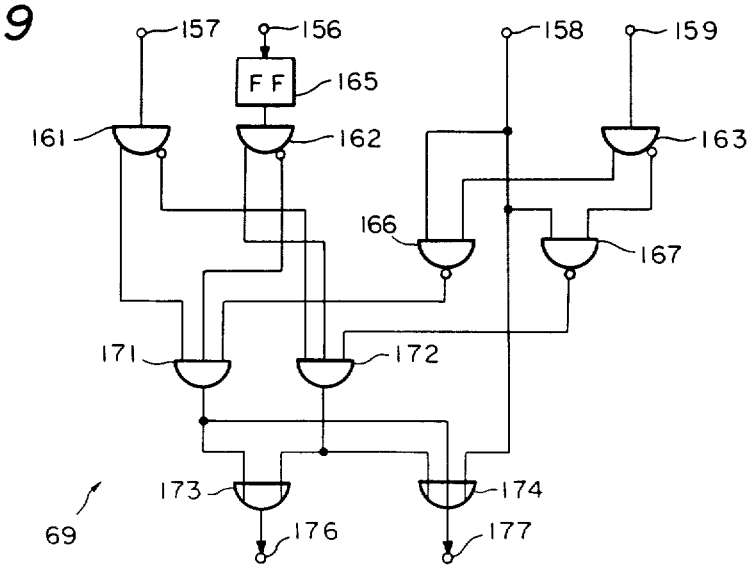
FIG. 9 is a block diagram of a fourth prediction checking circuit for use in the instruction prefetching device depicted in FIG. 1.

Further turning to FIG. 9, the fourth prediction checking circuit 69 has first through fourth input terminals 156, 157, 158, and 159 supplied with the validity bit V from the fourth branch information register 54, the branch indicating signal from the instruction executing unit 35, and outputs of the fourth and the fifth flip-flop circuits 74 and 75, respectively. First through third truth-false circuits 161, 162, and 163 are connected to the second input terminal 157, to the first input terminal 156 through a flip-flop circuit 165, and to the fourth input terminal 159. First and second NAND circuits 166 and 167 and first and second three-input AND circuits 171 and 172 are connected as follows.

The first truth-false circuit 161 delivers its truth output to a first input of the first three-input AND circuit 171 and its false output to a first input of the second three-input AND circuit 172. The second truth-false circuit 162 delivers its false output to a second input of the first AND circuit 171 and its truth output to a second input of the second AND circuit 172. Having a first input connected to the third input terminal 158 and a second input supplied with a truth output of the third truth-false circuit 163, the first NAND circuit 166 delivers its output to a third input of the first AND circuit 171. Having a first input connected to the third input terminal 158 and a second input supplied with a false output of the third truth-false circuit 163, the second NAND circuit 167 delivers its output to a third input of the second AND circuit 172.

A two-input OR circuit 173 is fed from the first and the second three-input AND circuits 171 and 172. A three-input OR circuit 174 is fed from the first and the second AND circuits 171 and 172 and from the third input terminal 158. The two-input OR circuit 173 delivers the fourth prediction error signal to a first output terminal 176 of the fourth prediction checking circuit 69. The three-input OR circuit 174 delivers the fourth BHT renewal signal to a second output terminal 177 of the fourth prediction checking circuit 69.

The fourth flip-flop circuit 74 holds the logic zero value when none of the first through the third prediction error signals is produced with the logic one value. The fifth flip-flop circuit 75 holds the logic zero value when neither the second nor the third prefetch correcting signal is produced with the logic one value. It is to be noted in this connection that the first prefetch correcting signal is produced with the logic one value when the predicted branch direction of the "go" to branch direction should not be the "go" to branch direction. The fifth flip-flop circuit 75 therefore holds the logic zero value when none of the first through third prefetch correcting signals indicates that the predicted branch direction of the "no go" to branch direction should be the "go" to branch direction. The fourth flip-flop circuit 74 holds the logic value when the fifth flip-flop circuit 75 holds the logic one value.

In view of the above, the first NAND circuit 166 produces its output with the logic one value either when none of the first through the third prediction error signals is produced with the logic one value or when the predicted branch direction should not be the "go" to branch direction. In this event, the first three-input AND circuit 171 gives the logic one value to the fourth prediction error signal and the BHT renewal indicating signal when the branch indicating signal indicates the "go" to branch direction and furthermore when the predicted branch direction is the "no go" to branch direction.

The second NAND circuit 167 produces its output with the logic one value either when none of the first through the third prediction error signals is produced with the logic one value or when the predicted branch direction should be the "go" to branch direction. In this event, the second three-input AND circuit 172 gives the logic one value to the fourth prediction error signal and the BHT renewal indicating signal when the branch indicating signal indicates the "no go" to branch direction and moreover when the predicted branch direction is the "go" to branch direction. In the manner described above, the BHT renewal indicating signal has the logic one value when at least one of the first through the fourth prediction error signals is given the logic one value.

Referring back to FIG. 1, the instruction prefetch control circuit 47 delivers first and second selection signals to the request address selector 42 and the address recover selector 62, respectively. Attention will be directed at first to the BHT renewal indicating signal. Five others of the six input signals may have the logic one and/or zero values. Only when the BHT renewal indicating signal is given the logic one value and subsequently turned back to the logic zero value one machine cycle after, is the content of the address recover register 61 transferred to the instruction address register 41. Otherwise, the content of the address recover register 61 is not used.

It will now be assumed that the instruction prefetch control circuit 47 is supplied with the six input signals of the logic zero value. That is to say, the address hit signal has the logic zero value with the logic zero value given to all of the first through the fourth prediction error signals and the BHT renewal indicating signal. Under the circumstances, the first and the second selection signals make the selectors 42 and 62 select the "no go" to branch address supplied from the request address register 45. One machine cycle after, the "no go" to branch address is set in the instruction address register 41 and the address recover register 61. In response to the content of the instruction address register 41, an instruction word is read out of the instruction memory 31. In this manner, prefetch of at least one instruction is continued to the "no go" to branch side or direction.

When the address hit signal is turned to the logic one value, the instruction prefetch control circuit 47 makes the selectors 42 and 62 select the "go" to branch address sent from the branch history table 46. The prefetch is directed to the "go" to branch side or direction. Ordinarily, the address hit signal turns back to the logic one value one machine cycle later. After the branch destination instruction is prefetched as a prefetched instruction in compliance with the "go" to branch address, the prefetch is continued for at least one instruction that next follows the prefetched instruction on the "no go" to branch side.

The above-described assumption is such that the predicted branch information is correct. The "no go" to and the "go" to branch addresses are used in the prefetch depending on the address hit signal, namely, the predicted branch direction. At any rate, the instruction prefetch control circuit 47 allows continuance of the prefetch in accordance with the predicted branch direction.

When the first prediction error signal is produced with the logic one value because the address hit signal is erroneously given the logic one value for an instruction which is not a branch instruction BC, the instruction prefetch control circuit 47 makes the selectors 42 and 62 select the first corrected address delivered from the first instruction address adder 56. In this manner, the instruction prefetch control circuit 47 corrects continuance of the prefetch to the "no go" to branch direction despite the fact that the predicted branch direction is an erroneous branch direction of the "go" to branch direction. The first prediction error signal is given a higher priority than the address hit signal. It is now clear that the first prediction error signal is used also as the first prefetch correcting signal.

At this time instant, the current instruction is processed in the operand address generating circuit 37. A few instructions are already prefetched as prefetched instructions. The instruction decoding circuit 36 is dealing with one of the prefetched instructions that next follows the current instruction. In the known manner, such prefetched instructions are cancelled, namely, are no longer delivered to the operand address generating stage. The erroneous branch direction is later corrected in the branch history table 46 in the manner which will later be described.

When the second prediction error signal is produced with the logic one value due to the fact that the address hit signal is erroneously given the logic zero value either for an unconditional branch instruction UB or for a branch count instruction BCT for which the variable count is not equal to unity, the instruction prefetch control circuit 47 makes the selectors 42 and 62 select the second corrected address supplied from the first instruction address selector 86. The second prefetch correcting signal is produced in this event with the logic one value. The second corrected address is for the branch destination address on the "go" to branch side. The instruction prefetch control circuit 47 therefore corrects the continuance of the prefetch to the "go" to branch side despite the fact the predicted branch direction is an erroneous branch direction of the "no go" to branch direction. The second prediction error signal is given a higher priority than the first prediction error signal.

At this instant, the current instruction is processed by the operand address translating circuit 38. The prefetched instructions are cancelled, namely, are no longer processed in the operand reading stage. The erroneous branch direction is later corrected in the branch history table 46.

When the third prediction error signal is produced with the logic one value due to discrepancy between the predicted destination address and the "go" to branch destination address for a branch instruction BC for which the predicted branch direction is correct, the instruction prefetch control circuit 47 makes the selectors 42 and 62 select the third corrected address delivered from the fourth branch information register 54. The instruction prefetch control circuit 47 thereby corrects continuance of the prefetch to an instruction of the third corrected address despite the fact that the predicted destination address is an erroneous destination address, that is, the fact that the predicted branch information is erroneous as regards the predicted destination address. The third prediction error signal is given a higher priority than the second prediction error signal.

At this instant of time, the current instruction is processed by the operand reading circuit 39. The prefetched instructions are cancelled, namely, are no longer processed in the executing stage. The erroneous destination address is later corrected in the branch history table 46.

It will now be assumed that the fourth prediction error signal is produced with the logic one value. In this event, the logic one value is given also to the BHT renewal indicating signal. The branch indicating signal may have either the logic one value indicative of the "go" to branch direction or the logic zero value which indicates the "no go" to branch direction. At any rate, the instruction prefetch control circuit 47 controls the selectors 42 and 62 in the manner which will presently be described. The instruction prefetch control circuit 47 thereby corrects continuance of the prefetch in cooperation with the second instruction address selector 87. The fourth prediction error signal is given a higher priority than the third prediction error signal.

If the branch indicating signal has the logic one value, the second instruction address selector 87 delivers the "go" to branch destination address of the fifth branch information register 55 as the selected address to the selected address register 63 and to the address recover selector 62. If the branch indicating signal has the logic zero value, the second instruction address selector 87 delivers the next instruction address of the "no go" to branch side as the selected address from the third instruction address adder 58 to the selected address register 63 and to the address recover selector 62. At the same time, the instruction address of the current instruction is delivered from the fifth branch information register 55 to the request address selector 42 as the write address for the branch history table 46.

Responsive to the fourth prediction error signal of the logic one value, the instruction prefetch control circuit 47 makes the address recover selector 62 select the selected address. Supplied simultaneously with the BHT renewal indicating signal of the logic one value, the instruction prefetch control circuit 47 makes the request address selector 41 select the write address. On machine cycle after, these addresses are set in the instruction address register 41 and the address recover register 61. At this moment, the BHT renewal indicating signal is delivered to the branch history table 46 as the write indicating signal through the sixth flip-flop circuit 76. The branch history table 46 is updated or nenewed in compliance with the write address set in the instruction address register 41 and the selected address set in the selected address register 63. Also at this moment, the instruction prefetch control circuit 47 makes the request address selector 42 select the content of the address recover register 61. One machine cycle later, the content of the address recover register 61 is set in the instruction address register 41 and is used in continuously carrying out the prefetch.

If produced with the logic one value when the current instruction is processed in the operand address generating stage, the first prediction error signal is used as the BHT renewal indicating signal through the first, the second, and the fourth flip-flop circuits 71, 72, and 74. Also in this event, the instruction prefetch control circuit 47 makes the request address selector 42 select the write address. The address recover selector 62 is made to select the first corrected address supplied from the first instruction address adder 56. The selected address is set in the selected address register 63. It is to be noted that the instruction prefetch control circuit 47 makes the address recover selector 62 select the selected address only when the fourth prediction error signal is produced with the logic one value.

One machine cycle after production of the BHT renewal indicating signal with the logic one value, the write indicating signal reaches the branch history table 46 to reset the validity bit V to the logic zero value. The branch destination address may be updated to the selected address but is void because the validity bit V is reset. Before renewal of the branch history table 46, the address hit signal will be held at the logic zero value to supply the instruction address register 41 from the request address adder 45 successively with the "no go" to branch addresses until an instruction address of a certain instruction which may be named a specific instruction for the present. The prefetch continues to the specific instruction. One machine cycle after renewal of the branch history table 46, the instruction address register 41 is loaded with a "no go" to branch address of an instruction which next follows the specific instruction. In this manner, prefetch is continued as will later be described more in detail.

When the second prediction error signal is produced with the logic one value, the second corrected address is set in the address recover register 61. When the third prediction error signal is produced with the logic one value, the third corrected address is set in the address recover register 62. In either event, the write address is set in the instruction address register 41. The selected address is set in the selected address register 63. Renewal of the branch history table 46 and continuance of the prefetch are carried out in the manner which will later be described more in detail.

In the manner discussed in detail in the Hanatani et al patent application and in the elder patent application, a pair of first and second entries must be deleted from the branch history table 46 for a new pair of entries as the case may be. In such an event, either the FIFO or the LRU scheme may be resorted to.

Figure 10:
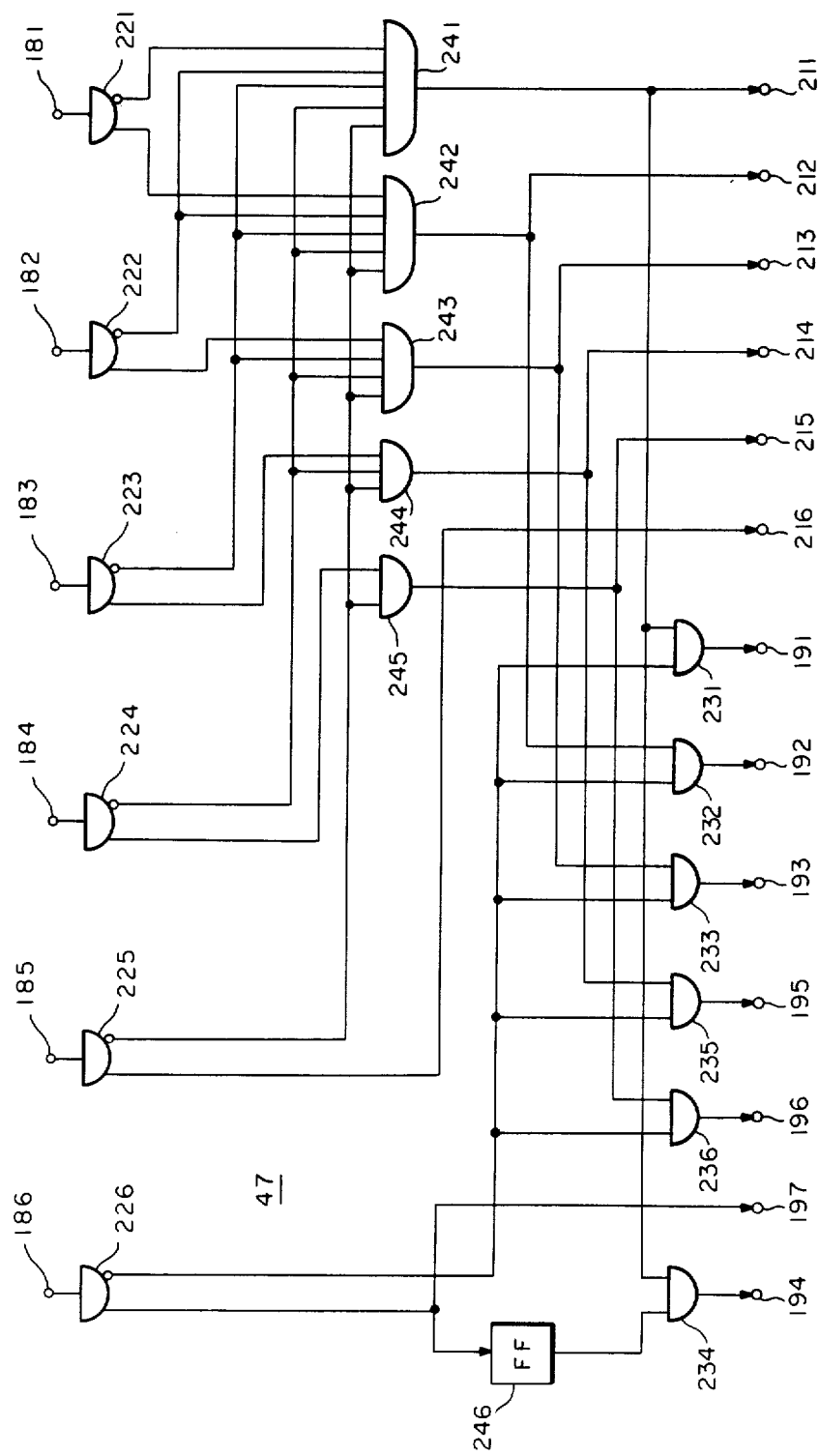
FIG. 10 is a block diagram of an instruction prefetch control circuit for use in the instruction prefetching device shown in FIG. 1.

Turning now to FIG. 10, the instruction prefetch control circuit 47 has first through sixth input terminals 181, 182, 183, 184, 185, and 186, first through seventh primary output terminals 191, 192, 193, 194, 195, 196, and 197, and first through sixth secondary output terminals 211, 212, 213, 214, 215, and 216. The first input terminal 181 is supplied with the address hit signal from the branch history table 46. The second through the fifth input terminals 182 to 185 are supplied with the first through the fourth prediction error signals. The sixth input terminal 186 is supplied with the BHT renewal indicating signal from the fourth prediction checking circuit 69.

The primary output terminals 191 through 197 are for the first selection signal delivered to the request address selector 42. The secondary output terminals 211 through 216 are for the second selection signal for the address recover selector 62. The first primary and secondary output terminals 191 and 211 are for supplying the instruction address register 41 and the address recover register 61 with the "no go" to branch address from the request address adder 45. The second primary and secondary output terminals 192 and 212 are for setting the "go" to branch address in the instruction address register 41 and the address recover register 61 from the branch history table 46. The third primary and secondary output terminals 193 and 213 are for the first corrected address of the first instruction address adder 56. The fourth primary output terminal 194 is for transferring the content of the address recover register 61 to the instruction address register 41.

The fifth primary and the fourth secondary output terminals 195 and 214 are for setting the second corrected address in the instruction address register 41 and the address recover register 61 from the second instruction address adder 57 or from the instruction address translating circuit 33. The sixth primary and the fifth secondary output terminals 196 and 215 are for the third corrected address of the fourth branch information register 54. The sixth secondary output terminal 216 is for the selected address supplied from the second instruction address selector 87. The seventh primary output terminal 197 is for the instruction address held in the fifth branch information register 55 for use as the write address.

The instruction prefetch control circuit 47 comprises first through sixth truth-false circuits 221, 222, 223, 224, 225, and 226 connected to the first through the sixth input terminals 181 to 186, first through sixth primary AND circuits 231, 232, 233, 234, 235, and 236 having outputs connected to the first through the sixth primary output terminals 191 to 196, and first through fifth secondary AND circuits 241, 242, 243, 244, and 245.

The sixth truth-false circuit 226 delivers its truth output directly to the seventh primary output terminal 197 and through a flip-flop circuit 246 to an input of the fourth primary AND circuit 234. Its false output is supplied to the first through the third, the fifth, and the sixth primary AND circuits 231 to 233, 235, and 236.

The first secondary AND circuit 241 is a five-input AND circuit for receiving false outputs of the first through the fifth truth-false circuits 221 to 225 and for delivering its output to the first and the fourth primary AND circuits 231 and 234 and directly to the first secondary output terminal 211. The second secondary AND circuit 242 is also a five-input AND circuit and is for receiving the false outputs of the first truth-false circuit 221 and truth outputs of the second through the fifth truth-false circuits 222 to 225 to deliver its output to the second secondary AND circuit 232 and directly to the second secondary output terminal 212. The third secondary AND circuit 243 is a four-input AND circuit for receiving the truth outputs of the second and the third truth-false circuits 222 and 223 and the false outputs of the fourth and the fifth truth-false circuits 224 and 225 to deliver its output to the third primary AND circuit 233 and directly to the third secondary output terminal 213. The fourth secondary AND circuit 244 is a three-input AND circuit for receiving the truth output of the third truth-false circuit 223 and the truth outputs of the fourth and the fifth truth-false circuits 224 and 225 to deliver its output to the fifth primary AND circuit 235 and directly to the fourth secondary output terminal 214. The fifth secondary AND circuit 245 is a two-input AND circuit for receiving the truth output of the fourth truth-false circuit 224 and the false output of the fifth truth-false circuit 225 to deliver its output to the sixth primary AND circuit 236 and directly to the fifth secondary output terminal 215.

The fifth truth-false circuit 225 supplies its truth output directly to the sixth secondary output terminal 216. It will be understood that the instruction prefetch control circuit 47 is operable in the manner described above.

Figure 11:
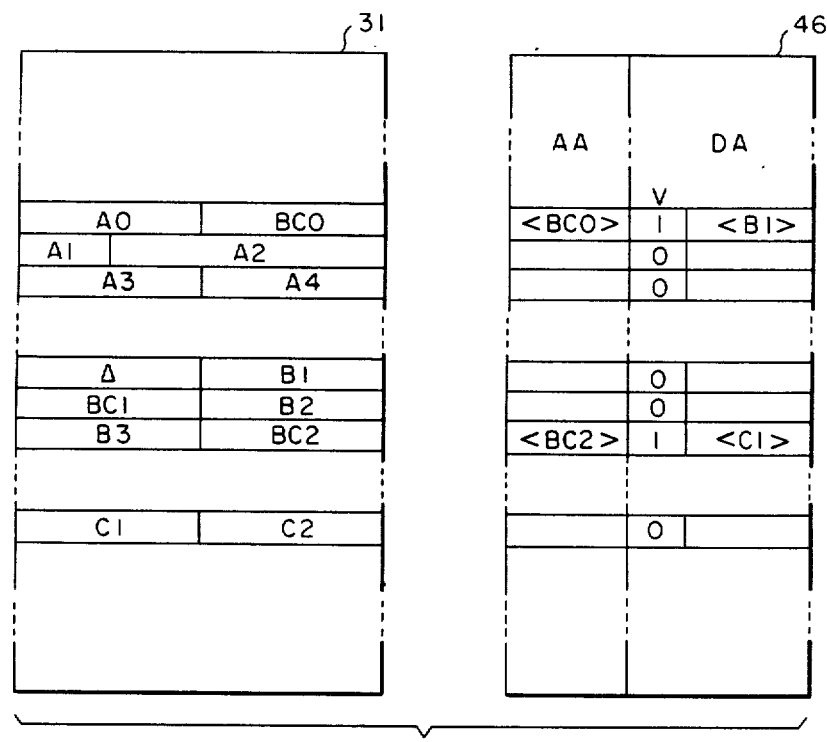
FIG. 11 is a diagram representative of correspondence between an instruction memory used in the data processing system depicted in FIG. 1 and a branch history table of the type mentioned in conjunction with FIG. 4.

Referring to FIG. 11, the instruction memory 31 is for eight-byte instruction words. Consideration will now be given to an instruction sequence which comprises instructions A0, BC0, A1, A2, A3, A4, ..., B1, BC1, B2, B3, BC2, ..., C1, C2 and so forth in succession. The instruction Bck (k being representative of zero and natural numbers) are branch instructions.

In correspondence to the instruction sequence memorized in the instruction memory 31, the branch history table 46 have first entries AA in which instruction address <BC0> and <BC2> are memorized for the branch instructions BC0 and BC2 which were found to indicate branch destination instructions B1 and C1 according to actual execution which was carried out on the branch instructions BC0 and BC2 next prior to prefetch of these instructions BC0 and BC2. It is herein surmised that the branch instruction BC1 does not indicate a branch destination instruction according to actual execution which was carried out on the branch instruction BC1 prior to prefetch of the instruction BC1. Alternatively, the branch instruction BC1 was never executed prior to prefetch thereof.

As the validity bit V of the second entries DA, the branch history table 46 memorizes the logic one value only for the branch instructions BC0 and BC2 and the logic zero value for the branch instruction BC1. It is assumed that the validity bit V of the logic zero value is memorized for each of other instructions, such as A1 and A2, B1, and C1. As the predicted destination address, the branch history table 46 memorizes branch destination addresses <B1> and <C1> for the branch instructions BC0 and BC2. A branch destination address may be memorised as a predicted destination address also for the branch instruction BC1. The predicted destination address is, however, void as described heretobefore and is not depicted.

Figure 12:
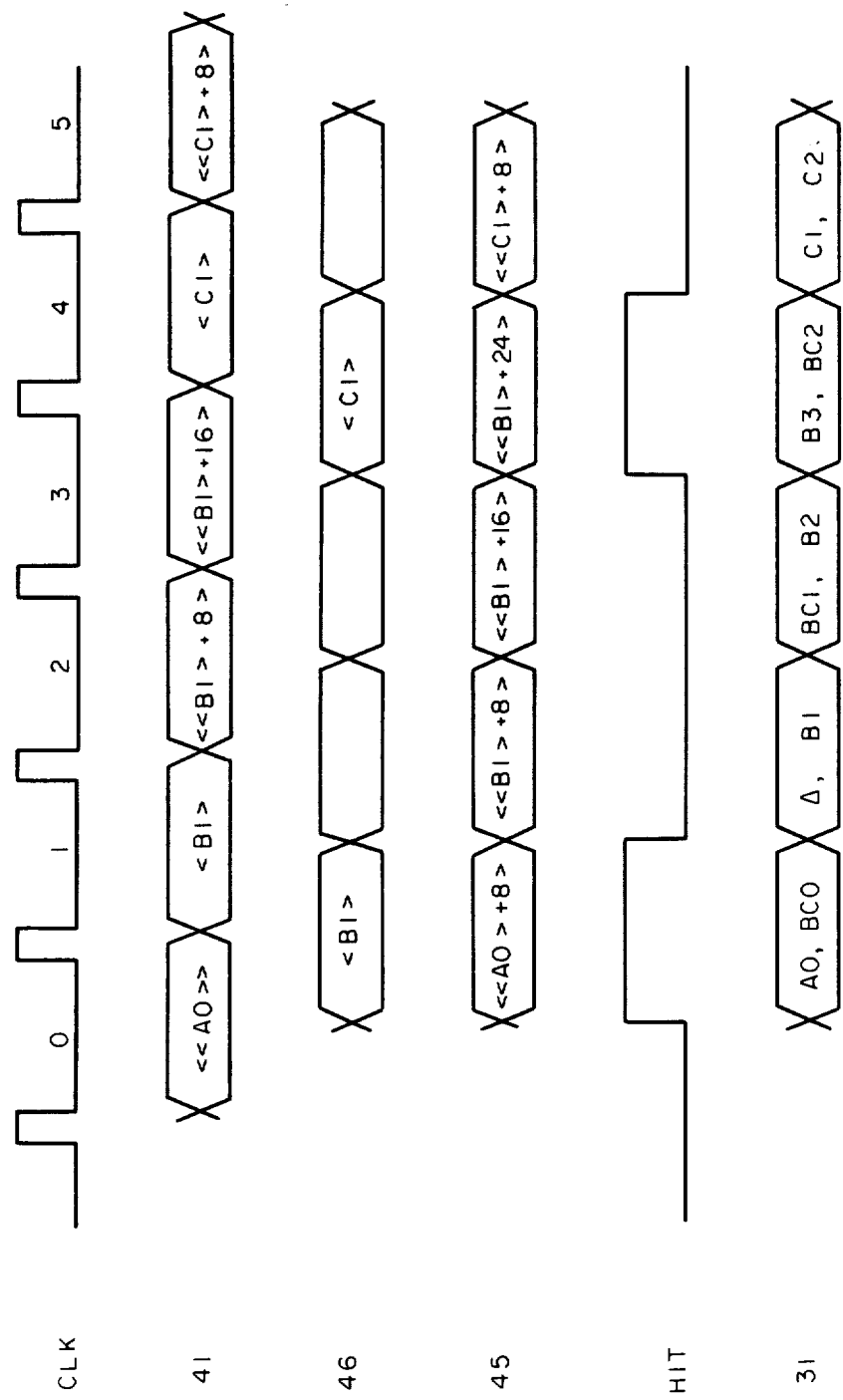
FIG. 12 is a schematic diagram for use in describing operation of the instruction prefetching device which comprises the branch history table illustrated in FIG. 11.

Referring to FIG. 12 in addition to FIG. 11, a clock pulse sequence CLK is depicted at the top. Zeroth through fifth machine cycles 0, 1, ..., and 5 are defined by the clock pulse sequence which is used as the machine clock described earlier. The zeroth machine cycle is a machine cycle in which the instruction address register 41 is loaded with a boundary address <<A0>> for an eight-byte instruction word which includes the instruction A0 in the manner depicted in FIG. 11. In the manner illustrated along the bottom line of FIG. 12, the instruction memory 31 produces the instruction word which consists of the instruction A0 and the branch instruction BC0. Inasmuch as the branch instruction address of the branch instruction BC0 is memorized in the first entry AA, the branch history table 46 produces the address hit signal with the logic one value as depicted along a line labelled HIT. The branch history table 46 furthermore delivers the branch destination address <B1>, which is set in the instruction address register 41 in the first machine cycle. In the meantime, the request address adder 45 produces a next request address <<A0>+8> as the "no go" to branch address.

In response to the branch destination address set in the instruction address register 41 in the first machine cycle, the instruction memory 31 produces an instruction word which consists of a certain instruction Δ and the branch destination instruction B1. The address hit signal is switched back to the logic zero value. Meanwhile, the request address adder 45 produces a next request address <<B1>+8>, which is set in the instruction address register 41 is the second machine cycle.

In response to the next request address set in the instruction address register 41 in the second machine cycle, the instruction memory 31 produces an instruction word which consists of the branch instruction BC1 and the instruction B2. The request address adder 45 produces another next request address <<B1>+16>. Inasmuch as the validity bit V has the logic zero value for the branch instruction BC1, the address hit signal is kept at the logic zero value. The next request address is therefore set in the instruction address register 41 in the third machine cycle.

In response to the next request address set in the instruction address register 41 in the third machine cycle, the instruction memory 31 produces an instruction word which consists of the instruction B3 and the branch instruction BC2. Inasmuch as the branch instruction BC2 has an instruction address memorized in the first entry AA, the branch history table 46 produces the address hit signal with the logic one value. The branch destination address <C1> is simultaneously produced by the branch history table 46 and is set in the instruction address register 41 in the fourth machine cycle. In the meantime, the request address adder 45 produces still another next request address <<B1>+24>.

In response to the branch destination address set in the instruction address register 41 in the fourth machine cycle, the instruction memory 31 produces an instruction word which consists of the instructions C1 and C2. The address hit signal is switched to the logic zero value. The request address adder 45 produces yet another next request address <<C1>+8>, which is set in the instruction address register in the fifth machine cycle. Prefetch of the instructions proceed in this manner unless at least one of the first through the fourth prediction error signals is produced with the logic one value.

Figure 13:
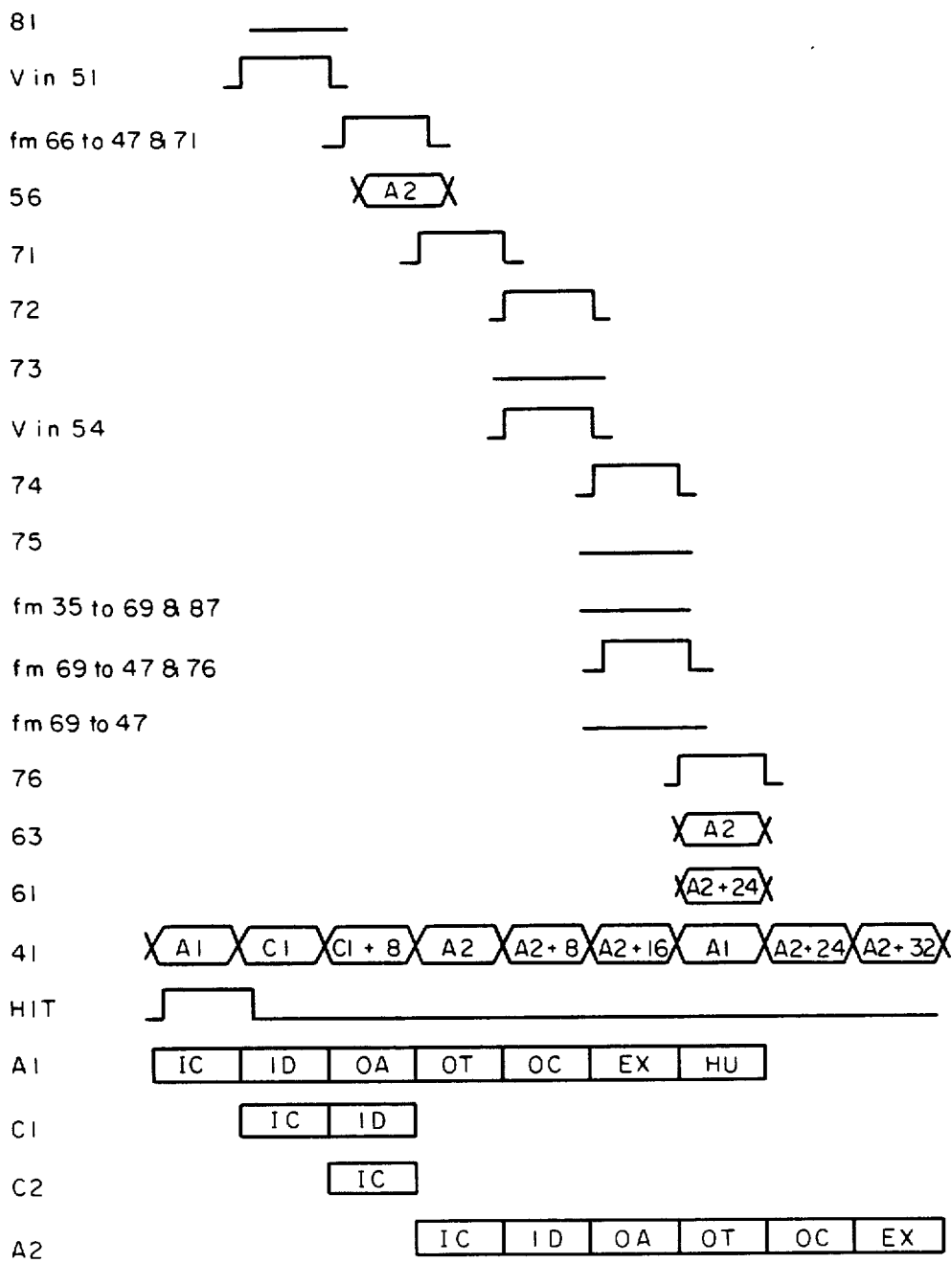
FIG. 13 is a schematic time chart for use in describing operation of the instruction prefetching device illustrated in FIG. 1.

Referring now to FIG. 13, the instruction prefetching device will be described with reference also to FIG. 1. Zeroth through eighth machine cycles are depicted along the top line. Four instructions are shown in a bottom part along four lines. It will be assumed that a first instruction A1 is not a branch instruction but has its instruction address in the first entry AA of the branch history table 46 and that the validity bit V of the logic one value is memorized in the corresponding second entry DA, It should be noted that the instruction addresses are depicted in FIG. 13 and the following figures by the symbols for the instructions per se. This is merely for simplicity of illustration.

In the zeroth machine cycle, the first instruction A1 is processed in the instruction reading stage. The branch history table 46 produces the address hit signal with the logic one value in the manner depicted along a line which is next above the line for the instruction A1 and is labelled HIT. In order that the instruction A1 is so processed, the instruction address <A1> is set in the instruction address register 41 as depicted. The branch history table 46 delivers a branch destination address <C1> for a first additional instruction C1 to the request address selector 42 and to the address recover selector 42 as the "go" to branch address. In the meantime, the request address adder 45 delivers the next request address of a second instruction A2 to the selectors 42 and 62 as the "no go" to branch address.

Also in the zeroth machine cycle, it will be assumed that none of the first through the fourth prediction error signals and the BHT renewal indicating signal is produced with the logic one value. Responsive to the address hit signal of the logic one value, the instruction prefetch control circuit 47 makes the selectors 42 and 62 select the "go" to branch address rather than the "no go" to branch address.

In the first machine cycle, the first instruction A1 is processed in the instruction decoding stage. The address hit signal is turned back to the logic one value. In the manner depicted below the top line, the instruction decoding circuit 36 delivers the first discrimination signal to the first signal line 81 with the logic zero value. In the meantime, the validity bit V of the logic one value is transferred to the first branch information register 51.

Also in the first machine cycle, the "go" to branch address of the first additional instruction C1 is set in the instruction address register 41 and the address recover register 61. In response to the content of the instruction address register 41, the instruction C1 is processed in the instruction reading stage as a prefetched instruction. The request address adder 45 delivers the next request address $<<C1>+8>$ of a second additional instruction C2 to the selectors 42 and 62 as the "no go" to branch address. If the instruction C1 is not a branch instruction, the branch history table 46 switches the address hit signal to the logic zero value. In this event, the instruction prefetch control circuit 47 makes the selectors 42 and 62 select the "no go" to branch address of the second additional instruction C2.

In the second machine cycle, the first instruction A1 is processed in the operand address generating stage. The first additional instruction C1 is processed in the instruction decoding stage. The "no go" to branch address of the second additional instruction C2 is set in the instruction address register 41 and the address recover register 61. Responsive to the content of the instruction address register 41, the instruction C2 is processed in the instruction reading stage. The request address adder 45 delivers the "no go" to branch address of the second instruction A2 to the selectors 42 and 62. It will be presumed that the address hit signal is kept at the logic zero value.

Also in the second machine cycle, the first prediction checking circuit 66 makes use of the first discrimination signal of the logic zero value and the validity bit V supplied from the first branch information register 51 with the logic one value and delivers the first prediction error signal of the logic one value to the instruction prefetch control circuit 47 and the first flip-flop circuit 71 as depicted. In the meantime, the first instruction address adder 56 delivers the next instruction address of the instruction A2 as the (first) corrected address to the selectors 42 and 62. Responsive to the first prediction error signal of the logic one value, the instruction prefetch control circuit 47 makes the selectors 42 and 62 select the corrected address with a higher priority than the "no go" to branch address supplied from the request address adder 45. The instructions C1 and C2 are cancelled and are not processed in the operand address generating stage.

In the third machine cycle, the first instruction A1 is processed in the operand address translating stage. The instruction address of the second instruction A2 is set in the instruction address register 41 and the address recover register 61. In response to the content of the instruction address register 41, the instruction A2 is processed in the instruction reading stage as a prefetched instruction. The request address adder 45 supplies the selectors 42 and 62 with the "no go" to branch address $<<A2>+8>$ for a third instruction A3 (not shown). The instruction A2 is not a branch instruction. The address hit signal is held at the logic zero value. The instruction prefetch control circuit 47 makes the selectors 42 and 62 select the "no go" to branch address of the third instruction A3. In the manner depicted, the first flip-flop circuit 71 holds the logic one value of the first prediction error signal.

In the fourth machine cycle, the instructions A1 and A2 are processed in the operand reading and the instruction decoding stages. The "no go" to branch address of the third instruction A3 is set in the instruction address register 41 and the address recover register 61. Responsive to the content of the instruction address register 41, the instruction A3 is processed in the instruction reading stage. The request address adder 45 supplies the selectors 42 and 62 with the "no go" to branch address $<<A2>+16>$ of a fourth instruction A4 (not shown). The third instruction A3 is not a branch instruction. The address hit signal is maintained at the logic zero value. The instruction prefetch control circuit 47 makes the selectors 42 and 62 select the "no go" to branch address of the instruction A4.

Also in the fourth machine cycle, the second flip-flop circuit 72 holds the logic one value which is transferred from the first flip-flop circuit 71. The third flip-flop circuit 73 holds the second prefetch correcting signal which is produced by the second prediction checking circuit 67 for the first instruction A1 with the logic zero value. In the example being illustrated, the validity bit V of the logic one value is moved from the third branch information register 53 and set in the fourth branch information register 54 for the first instruction A1. The second and the third flip-flop circuits 72 and 73 indicate the facts that the branch information is incorrect in the branch history table 46 for the first instruction A1 and should be corrected and that the prefetch is already corrected to the "no go" to branch direction for the second and the third instructions A2 and A3 with the instructions C1 and C2 cancelled.

In the fifth machine cycle, the first through the third instructions A1 to A3 are processed in the executing, the operand address generating, and the instruction decoding stages. The instruction address of the fourth instruction A4 is set in the instruction address register 41 and the address recover register 61. Responsive to the content of the instruction address register 41, the instruction A4 is processed in the instruction reading stage. The request address adder 45 delivers the "no go" to branch address $<<A2>+24>$ of a fifth instruction A5 (not shown) to the selectors 42 and 62. In the manner depicted, the fourth and the fifth flip-flop circuits 74 and 75 hold the logic one and the logic zero values which are transferred from the second and the third flip-flop circuits 72 and 73 and are not changed by the third prediction checking circuit 68 for the first instruction A1. On the other hand, the instruction executing unit 35 delivers the branch indicating signal with the logic zero value to the fourth prediction checking circuit 69 and the second instruction address selector 87. The fourth prediction checking circuit 69 delivers the BHT renewal indicating signal of the logic one value to the instruction prefetch control circuit 47 and the sixth flip-flop circuit 76 and supplies the fourth prediction error signal of the logic zero value to the instruction prefetch control circuit 47. This shows the facts that the 5 instructions A1 through A4 are already correctly prefetched and that the validity bit V is incorrectly recorded in the branch history table 46 for the first instruction A1 and should be corrected.

Also in the fifth machine cycle, the instruction address of the first instruction A1 is sent from the fifth branch information register 55 to the request address selector 42 alone as the write address. As the selected address, the second instruction address selector 87 selects the next instruction address which is produced by the third instruction address adder 58 for the second instruction A2. The selected address is delivered to the address recover selector 62 and the selected address register 63. Responsive to the fourth prediction error signal of the logic zero value, the instruction prefetch control circuit 47 makes the request address selector 42 select the write address irrespective of the address hit signal and the first through the third prediction error signals. The fourth instruction A4 is not a branch instruction. The address hit signal has the logic zero value. The instruction prefetch control circuit 47 therefore makes the address recover selector 62 select the "no go" to branch address of the fifth instruction A5. If the address hit signal were produced with the logic one value for the fourth instruction A4, the selector 62 would be made to select the branch destination address memorized in the branch history table 46. If the first prediction error signal were produced with the logic one value for the second instruction A2, the selector 62 would be made to select the first corrected address with a higher priority than the address hit signal.

In the sixth machine cycle, the instruction prefetch control circuit 47 carries out a history updating (HU) stage for the first instruction A1. As depicted, the sixth flip-flop circuit 76 holds the logic one value of the BHT renewal indicating signal. The selected address of the second instruction A2 is set in the selected address register 63. The "no go" to branch address of the first instruction A5 is set in the address recover register 61 and is delivered therefrom to the instruction address selector 42. The write address of the first instruction A1 is set in the instruction address register 41. In response to the write indicating signal delivered from the sixth flip-flop circuit 76 to the branch history table 46, the validity bit V is reset to the logic zero value for the first entry AA which is retrieved by the write address. The selected address may be transferred from the selected address register 63 to the branch history table 46 at the write address. Irrespective of the branch destination address, the first instruction A1 is no longer predicted as a branch instruction.

Also in the sixth machine cycle, the instruction prefetch control circuit 47 makes the request address selector 42 select the content of the address recover register 61 in response to the BHT renewal indicating signal supplied thereto with the logic one value in the fifth machine cycle. Inasmuch as the instruction address of the first instruction A1 is set in the instruction address register 41 and inasmuch as the first instruction A1 is no longer a branch instruction, the branch history table 46 produces the address hit signal with the logic zero value. The instruction prefetch control circuit 47 makes the address recover selector 61 select the "no go" to branch address of the second instruction A2. If the first prediction error signal were produced with the logic one value for the third instruction A3, the address recover selector 62 would be made to select the first corrected address with a higher priority. If the second prediction error signal were produced with the logic one value for the second instruction A2, the address recover selector 62 would be made to select the second corrected address with a still higher priority. Incidentally, the second corrected address is the "go" to branch address when the second prefetch correcting signal is produced with the logic one value. The second corrected address is the next instruction address of the second instruction address adder 57 when the second prefetch correcting signal is produced with the logic zero value.

In the seventh machine cycle, the second through the fourth instructions A2 to A4 are processed in the operand reading and the operand address translating and generating stages. The instruction address of the fifth instruction A5 is set in the instruction address register 41. The fifth instruction A5 is processed in the instruction reading stage. The request address adder 45 produces the "no go" to branch address $<<A2>+32>$ for a sixth instruction A6 (not shown). The prefetch is continued in the "no go" to branch direction until a branch instruction appears.

Figure 14:
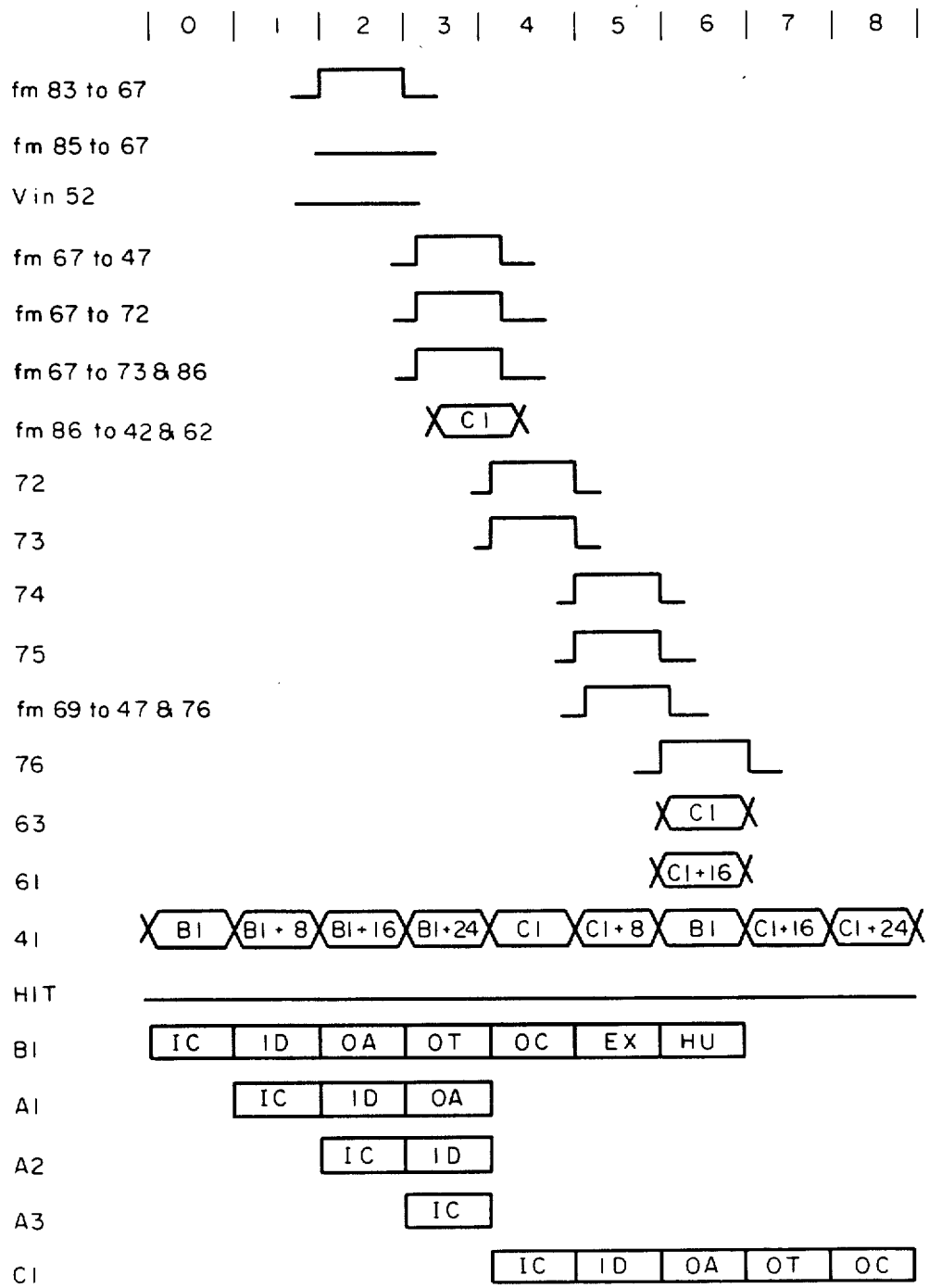
FIG. 14 is another schematic time chart for use in describing operation of the instruction prefetching device shown in FIG. 1.

Referring to FIG. 14, the instruction prefetching device will again be described with reference also to FIG. 1. Five instructions are shown. It will be assumed that an instruction B1 is either an unconditional branch instruction UB or a branch count instruction BCT for which the variable count is not equal to unity. In either event, the branch instruction B1 indicates a branch destination instruction C1, namely, a first instruction that should next follow the branch instruction B1 on the "go" to branch side. The validity bit V is, however, incorrectly recorded in the branch history table 46 for the branch instruction B1 to indicate the "no go" to branch direction as the predicted branch direction.

In the zeroth machine cycle, the instruction address of the branch instruction B1 is set in the instruction address register 41. In response, the branch instruction B1 is processed in the instruction reading stage. The address hit signal is produced with the logic zero value. In the meantime, the request address adder 45 supplies the request address selector 42 and the address recover selector 62 with the "no go" to branch address $<<B1>+8>$ for a first instruction A1 which next follows the branch instruction B1 on the "no go" to branch side. As before, it will be assumed that none of the first through the fourth prediction error signals and the BHT renewal indicating signal is produced with the logic one value. Responsive to the address hit signal of the logic zero value, the instruction prefetch control circuit 47 makes the selectors 42 and 62 select the "no go" to branch address of the first instruction A1.

In the first machine cycle, the branch instruction B1 is processed in the instruction decoding stage. Although not depicted, the instruction decoding circuit 36 delivers the first discrimination signal of the logic one value to the first signal line 81. The validity bit V of the logic zero value is transferred to the first branch information register 51. The first prediction error signal is, however, produced with the logic zero value. The instruction decoding circuit 36 moreover delivers the second discrimination signal of the logic one value to the intermediate register 83.

Also in the first machine cycle, the "no go" to branch address of the first instruction A1 is set in the instruction address register 41 and the address recover register 61. Responsive to the content of the instruction address register 41, the instruction A1 is processed in the instruction reading stage. The request address adder 45 supplies the selectors 42 and 62 with the "no go" to branch address $<<B1>+16>$ of a second instruction A2. The address hit signal is kept at the logic zero value. The instruction prefetch control circuit 47 makes the selectors 42 and 62 select the "no go" to branch address of the second instruction A2.

In the second machine cycle, the branch instruction B1 and the first instruction A1 are processed in the operand address generating and the instruction decoding stages. In the manner depicted near the top line, the intermediate register 83 delivers the second discrimination signal of the logic one value to the second prediction checking circuit 67. The comparator 85 delivers the count one signal of the logic zero value to the second prediction checking circuit 67. Meanwhile, the validity bit V of the logic zero value is transferred from the first branch information register 51 and set in the second branch information register 52.

Also in the second machine cycle, the instruction address of the second instruction A2 is set in the instruction address register 41 and the address recover register 62. Responsive to the content of the instruction address register 41, the second instruction A2 is processed in the instruction reading stage. The request address adder 45 supplies the "no go" to branch address $<<B1>+24>$ of a third instruction A3 to the selectors 42 and 62. Responsive to the address hit signal of the logic zero value, the instruction prefetch control circuit 47 makes the selectors 42 and 62 select the instruction address of the third instruction A3.

In the third machine cycle, the branch instruction B1 is processed in the operand address translating stage. The first and the second instructions A1 and A2 are processed in the operand address generating and the instruction decoding stages. The instruction address of the third instruction A3 is set in the instruction address register 41 and the address recover register 61. The third instruction A3 is processed in the instruction reading stage. The request address adder 45 supplies the selectors 42 and 62 with the "no go" to branch address of a fourth instruction A4 (not shown). On the other hand, the instruction address translating circuit 33 translates the logical branch destination address of the branch destination instruction C1 to a "go" to branch destination address $<C1>$.

Also in the third machine cycle, the second prediction checking circuit 67 makes use of the second discrimination signal of the logic one value, the count one signal of the logic zero value, and the validity bit V of the logic zero value and delivers the second prediction error signal of the logic one value to the instruction prefetch control circuit 47 as depicted. The second BHT renewal signal is delivered to the second flip-flop circuit 72 also with the logic one value. The second prefetch correcting signal of the logic one value is delivered to the third flip-flop circuit 73 and the first instruction address selector 86. Responsive to the second prefetch correcting signal of the logic one value, the first instruction address selector 86 delivers the "go" to branch address of the branch destination instruction C1 as the (second) corrected address to the selectors 42 and 62. Responsive to the second prediction error signal of the logic one value, the instruction prefetch control circuit 47 makes the selectors 42 and 62 select the "go" to branch destination address of the branch destination instruction C1. The instructions A1 through A3 of the "no go" to branch side are cancelled. Although supplied with the instruction address of the fourth instruction A4, the selectors 42 and 62 are not made to select the same.

In the fourth machine cycle, the branch instruction B1 is processed in the operand reading stage. The "go" to branch destination address of the branch destination instruction C1 is set in the instruction address register 41 and the address recover register 61. Responsive to the content of the instruction address register 41, the branch destination instruction C1 is processed in the instruction reading stage. The request address adder 45 supplies the selectors 42 and 62 with the "no go" to branch address $<<C1>+8>$ of a second instruction C2 which next follows (not shown) on the "no go" to branch side the branch destination instruction, namely, the first instruction C1. In the manner depicted, the second and the third flip-flop circuits 72 and 73 hold the second BHT renewal signal of the logic one value and the second prefetch correcting signal which has also the logic one value. This indicates that the validity bit V has logic zero value to indicate an erroneous predicted branch direction in the branch history table 46 for the branch instruction B1 and should be corrected. Incidentally, the prefetch is already correctly directed to the "go" to branch direction despite the erroneous branch direction.

In the fifth machine cycle, the branch instruction B1 and the branch destination instruction C1 are processed in the executing and the instruction decoding stages. The instruction address of the second instruction C2 is set in the instruction address register 41 and the address recover register 61. Responsive to the content of the instruction address register 41, the second instruction C2 is processed in the instruction reading stage. The request address adder 45 supplies the selectors 42 and 62 with the "no go" to branch address $<<C1>+16>$ of a third instruction C3 which next follows (not shown) the second instruction C2 on the "no go" to branch side. As depicted, the fourth and the fifth flip-flop circuits 74 and 75 hold the logic one values which are transferred from the second and the third flip-flop circuits 72 and 73 through the third prediction checking circuit 68.

Although not shown, the branch indicating signal is produced with the logic one value from the instruction executing unit 35 by which the branch instruction B1 is processed in the executing stage. if the branch instruction B1 is an unconditional branch instruction UB, the branch indicating signal clearly has the logic one value. For a branch count instruction BCT, the instruction executing unit 35 reduces one from the variable count which is held in the general purpose register specified by the branch count instruction under consideration. It is assumed hereinabove that the variable count is not equal to unity when the branch count instruction in question is processed from the instruction reading stage until the executing stage. The variable count therefore does not become equal to zero, when the loop should be left. Responsive to the branch indicating signal of the logic one value, the second instruction address selector 87 supplies the address recover selector 62 and the selected address register 63 as the selected address with the "go" to branch destination address which is transferred from the fourth branch information register 54 for the branch destination instruction C1 and held in the fifth branch information register 55. At the same time, the request address selector 42 is supplied with the instruction address which is held in the fifth branch information register 55 for the branch instruction B1.

Also in the fifth machine cycle, the fourth prediction checking circuit 69 makes use of the validity bit V held in the fourth branch instruction register 54 with the logic zero value for the branch instruction B1, the branch indicating signal of the logic one value, and the logic one values held in the fourth and the fifth flip-flop circuits 74 and 75 and delivers the fourth prediction error signal of the logic one value to the instruction prefetch control circuit 47 and, as depicted, the BHT renewal indicating signal of the logic one value to the instruction prefetch control circuit 47 and the sixth flip-flop circuit 76. Responsive to the fourth prediction error signal of the logic one value, the instruction prefetch control circuit 47 makes the selectors 42 and 62 select the instruction address of the branch instruction B1 and the 37 no go" to branch address of the third instruction C3. If the second instruction C2 were a branch instruction, the address hit signal would be produced with the logic one value in response to the "no go" to branch address set therefor in the instruction address register 41. In this event, the instruction prefetch control circuit 47 makes the address recover selector 62 select the "go" to branch address produced simultaneously for the second instruction C2 by the branch history table 46.

In the sixth machine cycle, the sixth flip-flop circuit 76 holds the logic one value of the BHT renewal indicating signal. The "go" to branch destination address of the branch destination instruction C1 is set as the selected address in the selected address register 63. The instruction address of the third instruction C3 is set in the address recover register 61. The instruction address of the branch instruction B1 is set in the instruction address register 41. Supplied with the BHT renewal indicating signal of the logic one value, the instruction prefetch control circuit 47 carries out the history updating stage for the branch instruction B1. Responsive to the write indicating signal of the sixth flip-flop circuit 76, the validity bit V is changed to the logic one value in the branch history table 46 at the write address indicated by the instruction address register 41 for the branch instruction B1. The "go" to branch destination address of the branch destination instruction C1 is written in the branch history table 46 at the instruction address of the branch instruction B1. The branch history table 46 is updated to indicate the "go" to branch direction and the branch destination address for the branch instruction B1.

Also in the sixth machine cycle, the second instruction C2 is processed in the operand address translating stage. The branch destination instruction C1 is processed in the operand address generating stage. If the first prediction error signal were produced with the logic one value for the branch destination instruction C1, the instruction prefetch control circuit 47 would make the address recover selector 62 select the first corrected address given by the first instruction address adder 56. The request address selector 42 would be made to select the instruction address of the branch instruction B1. This operation of the request address selector 42 is irrespective of the first prediction error signal.

In the seventh machine cycle, the branch destination instruction C1 and the second instruction C2 are processed in the operand address translating and generating stages. The instruction address of the third instruction C3 is set in the instruction address register 41 from the address recover register 61. The third instruction C3 is processed in the instruction reading stage. The request address adder 45 produces the "no go" to branch address $<<C1>+24>$ of a fourth instruction C4 (not shown). If the branch instruction B1 is an unconditional branch instruction UB, the prefetch is correctly continued in the "no go" to branch direction until appearance of another branch instruction BC. If the branch instruction B1 is the branch count instruction BCT under consideration, the loop is correctly repeated until the branch instruction B1 is repeatedly processed in the executing stage to reduce the variable count to unity.

Figure 15:
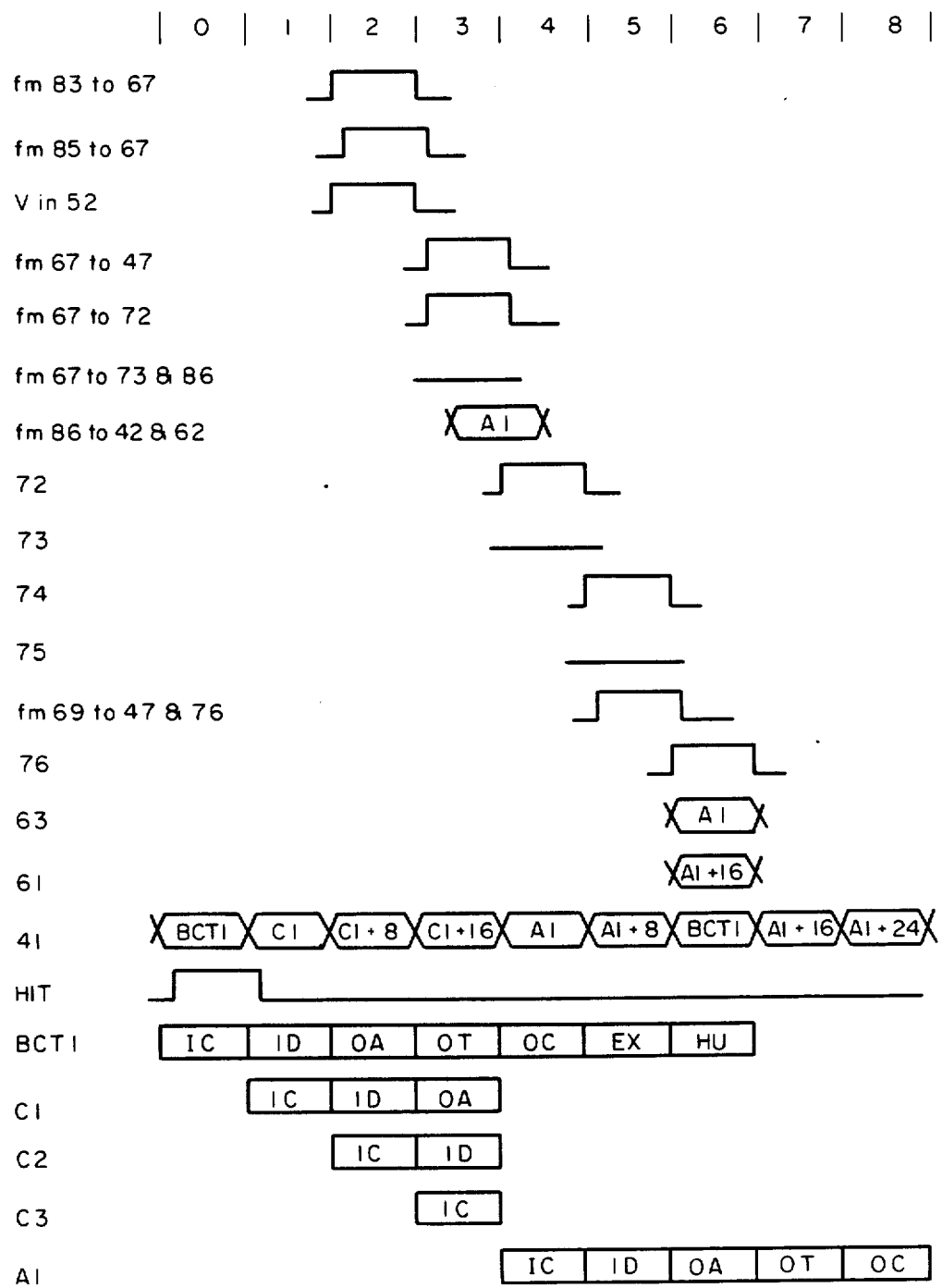
FIG. 15 is another schematic time chart for use in describing operation of the instruction prefetching device illustrated in FIG. 1.

Turning to FIG. 15, the instruction prefetching device will be described by also referring to FIG. 1. As before, five instructions are depicted. It will be assumed that the variable count is reduced to unity for a branch count instruction BCT1. In this instance, the validity bit V must be reset to the logic zero value in the branch history table 46 before the branch count instruction BCT1 is processed in the executing stage.

In the zeroth machine cycle, the instruction address of the branch count instruction BCT1 is set in the instruction address register 41. The instruction BCT1 is processed in the instruction reading stage. The request address adder 45 supplies the request address selector 42 and the address recover selector 62 with the "no go" to branch address of an instruction A1 which next follows the branch count instruction BCT1 in the "no go" to branch direction and will be referred to either a first out of loop instruction or briefly as a first instruction. The branch history table 46 delivers the address hit signal of the logic one value to the instruction prefetch control circuit 47 and supplies the selectors 42 and 62 with the "go" to branch address of an instruction C1 which next follows the branch count instruction BCT1 on the "go" to branch side and will be called a first loop instruction. Responsive to the address hit signal of the logic one value, the instruction prefetch control circuit 47 makes the selectors 42 and 62 select the "go" to branch address of the first loop instruction C1 rather than the "no go" to branch address of the first out of loop instruction A1.

In the first machine cycle, the branch count instruction BCT1 is processed in the instruction decoding stage. The "go" to branch address is set in the instruction address register 41 and the address recover register 61. Responsive to the content of the instruction address register 41, the first loop instruction C1 is processed in the instruction reading stage. The address hit signal is switched to the logic zero value. The request address adder 45 supplies the selector 42 and 62 with the "no go" to branch address of a second loop instruction C2. Responsive to the address hit signal of the logic zero value, the instruction prefetch control circuit 47 makes the selectors 42 and 62 select the "no go" to branch address of the second loop instruction C2. On the other hand, the instruction decoding circuit 36 decodes the branch count instruction BCT1 and delivers the second discrimination signal of the logic one value to the second signal line 82 and supplies the second branch information register 52 with the instruction bit length of the branch count instruction BCT1.

In the second machine cycle, the branch count instruction BCT1 and the first loop instruction C1 are processed in the operand address generating and the instruction decoding stages. The "no go" to branch address of the second loop instruction C2 is set in the instruction address register 41 and the address recover register 61. Responsive to the content of the instruction address register 41, the second loop instruction C2 is processed in the instruction reading stage. The request address adder 45 supplies the selectors 42 and 62 with the "no go" to branch address of a third loop instruction C3. The instruction prefetch control circuit 47 makes the selectors 42 and 62 select the "no go" to branch address.

In the manner depicted for the second machine cycle near the top line, the intermediate register 83 delivers the second discrimination signal of the logic one value to the second prediction checking circuit 67. The comparator 85 delivers the count one signal of the logic one value to the second prediction checking circuit 67. The validity bit V is held in the second branch information register 52 with the logic one value.

In the third machine cycle, the branch count instruction BCT1 and the first and the second loop instructions C1 and C2 are processed in the operand address translating and generating and the instruction decoding stages. Responsive to the "no go" to branch address set in the instruction address register 41, the third loop instruction C3 is processed in the instruction reading stage. In the meantime, the instruction address translating circuit 33 supplies, among others, the first instruction address selector 86 with the "go" to branch destination address that is the instruction address of the first loop instruction C1 under the circumstances.

Also in the machine cycle, the second prediction checking circuit 68 makes use of the second discrimination signal delivered from the intermediate register 83 with the logic one value, the count one signal of the logic one value, and the validity bit V held in the second branch information register 52 with the logic one value and delivers the second prediction error signal of the logic one value to the instruction prefetch control circuit 47, the second BHT renewal signal of the logic one value to the second flip-flop circuit 72, and the second prefetch correcting signal of the logic zero value to the third flip-flop circuit 73 and to the first instruction address selector 86. Responsive to the second prefetch correcting signal of the logic zero value, the first instruction address selector 86 supplies the selectors 42 and 62 with the (second) corrected address which is the next instruction address calculated by the second instruction address adder 57 for the first out of loop instruction A1 in this event. Supplied with the second prediction error signal of the logic one value, the instruction prefetch control circuit 47 makes the selectors 42 and 62 select the corrected address of the first instruction A1. The loop instructions C1 through C3 are cancelled because the loop should be left due to the fact that the variable count is already reduced to unity.

In the fourth machine cycle, the second and the third flip-flop circuits 72 and 73 hold the logic one and the logic zero values as depicted. The logic one value shows the fact that the validity bit V of the logic one value should be corrected to the logic zero value in the branch history table 46 for the branch count instruction BCT1. The logic zero value of the third flip-flop circuit 73 shows the fact that the prefetch of the loop instructions should be corrected to the out of loop instructions. The prefetch is, however, already corrected. In this machine cycle, the branch count instruction BCT1 is processed in the operand reading stage. The corrected address of the first out of loop instruction A1 is set in the instruction address register 41 and the address recover register 61. Responsive to the content of the instruction address register 41, the first instruction A1 is processed in the instruction reading stage. The request address adder 45 supplies the selectors 42 and 62 with the "no go" to branch address $<<A1>+8>$ of a second out of loop instruction A2 (not shown). The second prediction error signal and the address hit signal are switched to the logic zero value. The instruction prefetch control circuit 47 therefore makes the selectors 42 and 62 select the "no go" to branch address of the second instruction A2.

In the fifth machine cycle, the branch count instruction BCT1 is processed in the executing stage. The first instruction A1 is processed in the instruction decoding stage. Responsive to the "no go" to branch address set in the instruction address register 41, the second instruction A2 is processed in the instruction reading stage. The request address adder 45 supplies the selectors 42 and 62 with the "no go" to branch address $<<A1>+16>$ of a third out of loop instruction A3 (not shown). In the manner depicted, the fourth and the fifth flip-flop circuits 74 and 75 hold the logic one and the logic zero values which are transferred from the second and the third flip-flops 72 and 73 through the third prediction checking circuit 68.

Although not shown, the branch indicating signal of the logic zero value is delivered from the instruction executing unit 35 to the fourth prediction checking circuit 69 and the second instruction address selector 87 when the branch count instruction BCT1 is processed in the executing stage. This is because the branch count instruction BCT1 no more indicates repeated execution of the loop when the variable count is reduced to zero during execution of the branch count instruction BCT1 in the executing stage. Responsive to the branch indicating signal of the logic zero value, the second instruction address selector 87 supplies the address recover selector 62 and the selected address register 63 as the selected address with the next instruction address which is calculated by the third instruction address adder 58 for the first out of loop instruction A1 next following the branch count instruction BCT1 on the "no go" to branch side. At this time, the request address selector 42 is supplied with the instruction address which is held in the fifth branch information register 55 for the branch count instruction BCT1.

Also in the fifth machine cycle, the fourth prediction checking circuit 69 makes use of the validity bit V held in the fourth branch information register 54 with the logic one value for the branch count instruction BCT1, the branch indicating signal of the logic zero value, and the logic one and the logic zero values held in the fourth and the fifth flip-flop circuits 74 and 75, and delivers the fourth prediction error signal of the logic zero value to the instruction prefetch control circuit 47 and, in the manner depicted, the BHT renewal indicating signal of the logic one value to the instruction prefetch control circuit 47 and the sixth flip-flop circuit 76. Supplied with the BHT renewal indicating signal of the logic one value, the instruction prefetch control circuit 47 makes the request address selector 42 select the write address given by the instruction address of the branch count instruction BCT1. The address recover selector 62 is made to select the next instruction address of the third instruction A3. If the second instruction A2 were a branch instruction in this event, the address hit signal would be produced with the logic one value in response to the "no go" to branch address set therefor in the instruction address register 41. The instruction prefetch control circuit 47 would make the address recover selector 62 select the "go" to branch address produced by the branch history table 46.

In the sixth machine cycle, the sixth flip-flop circuit 76 holds the logic one value of the BHT renewal indicating signal. The selected address register 63 is loaded with the selected address of the first instruction A1. The address recover register 61 is loaded with the "no go" to branch address $<<A1>+16>$ of the third instruction A3. The instruction address register 41 is loaded with the write address which is the instruction address of the branch count instruction BCT1. Supplied with the BHT renewal indicating signal of the logic one value, the instruction prefetch control circuit 47 carries out the history updating stage on the branch count instruction BCT1. Responsive to the write indicating signal of the sixth flip-flop circuit 76, the validity bit V is changed to the logic zero value in the branch history table 46 at the write address indicated by the instruction address register 41 for the branch count instruction BCT1. The selected address is transferred from the selected address register 62 to the branch history table 46 and stored at the write address. The branch history table 46 is updated in this manner.

Also in the sixth machine cycle, the first and the second out of loop instructions A1 and A2 are processed in the operand address generating and the instruction decoding stages. If the first prediction error signal were produced with the logic one value for the first instruction A1, the instruction prefetch control circuit 47 would make the address recover selector 62 select the first corrected address produced by the first instruction address adder 56. The request address selector 42 is made to select the instruction address of the branch count instruction BCT1 without regard to the first prediction error signal.

In the seventh machine cycle, the first and the second out of loop instructions A1 and A2 are processed in the operand address translating and generating stages. The instruction address of the third instruction A3 is set in the instruction address register 41 from the address recover register 61. The third instruction A3 is processed in the instruction reading stage. The request address adder 45 produces the "no go" to branch address $<<A1>+24>$ of a fourth instruction A4 (not shown).

Figure 16:
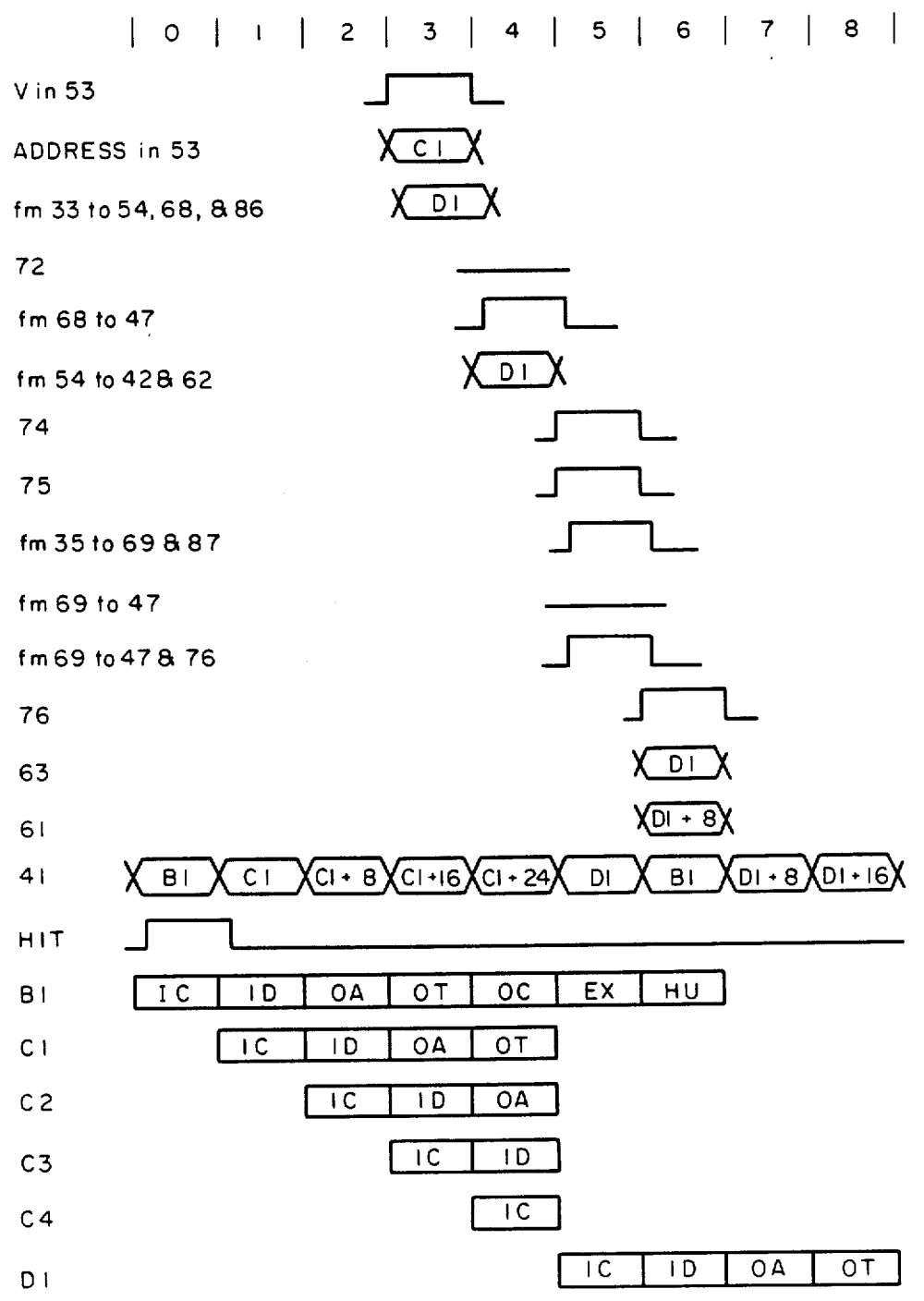

Referring to FIG. 16, the instruction prefetching device will again be described by referring also to FIG. 1. Six instructions are shown in a bottom part. It will now be presumed that a branch instruction B1 is either an unconditional branch instruction UB or another branch instruction BC that indicates the "go" to branch direction when processed in the executing stage. It will furthermore be presumed that the branch history table 46 memorizes, despite a correct branch direction, a branch destination address as a predicted destination address which is different from a "go" to branch destination address obtained when the branch instruction B1 is processed in the operand address translating stage, namely, a branch destination instruction C1 of the predicted destination address is processed in the instruction address translating stage. The branch destination instruction C1 will be called a first predicted branch instruction. An instruction of the "go" to branch destination address will be named a first branch direction instruction D1.

In the zeroth machine cycle, the instruction address of the branch instruction B1 is set in the instruction address register 41. The branch instruction B1 is processed in the instruction reading stage. The request address adder 45 supplies the request address selector 42 and the address recover selector 62 with the "no go" to branch address of a certain instruction which next follows the branch instruction B1 on the "no go" to branch side. The branch history table 46 delivers the address hit signal of the logic one value to the instruction prefetch control circuit 47 and supplies the selectors 42 and 62 with the "go" to branch address of the first predicted branch instruction C1. Responsive to the address hit signal of the logic one value, the instruction prefetch control circuit 47 makes the selectors 42 and 62 select the "go" to branch address rather than the "no go" to branch address.

In the first machine cycle, the branch instruction B1 is processed in the instruction decoding stage. The "go" to branch address is set in the instruction address register 41 and the address recover register 61. Responsive to the content of the instruction address register 41, the first predicted branch instruction C1 is processed in the instruction reading stage. The address hit signal is switched to the logic zero value. The request address adder 45 supplies the selectors 42 and 62 with the "no go" to branch address of a second predicted branch instruction C2. Responsive to the address hit signal of the logic zero value, the instruction prefetch control circuit 47 makes the selectors 42 and 62 select the "no go" to branch address.

In the second machine cycle, the branch instruction B1 and the first predicted branch instruction C1 are processed in the operand address generating and the instruction decoding stages. The "no go" to branch address is set in the instruction address register 41 and the address recover register 61. Responsive to the content of the instruction address register 41, the second predicted branch instruction C2 is processed in the instruction reading stage. The address hit signal is kept at the logic zero value. The request address adder 45 supplies the selectors 42 and 62 with the "no go" to branch address of a third predicted branch instruction C3. Responsive to the address hit signal of the logic zero value, the instruction prefetch control circuit 47 makes the selectors 42 and 62 select the "no go" to branch address.

In the third machine cycle, the branch instruction B1 and the first and the second predicted branch instructions C1 and C2 are processed in the operand address translating and generating, and the instruction decoding stages. Responsive to the "no go" to branch address set in the instruction address register 41, the third predicted branch instruction C3 is processed in the instruction reading stage. The request address adder 45 supplies the selectors 42 and 62 with the "no go" to branch address of a fourth predicted branch instruction C4. The instruction prefetch control circuit 47 makes the selectors 42 and 62 select the "no go" to branch address. On the other hand, the instruction address translating circuit 33 delivers the "go" to branch address of the first branch direction instruction D1 to the fourth branch information register 54, the third prediction checking circuit 68, and the first instruction address selector 86.

In the manner depicted for the third machine cycle adjacently below the top line, the validity bit V of the logic one value and the predicted destination address of the first predicted branch instruction C1 are held in the third branch information register 53. The "go" to branch destination address of the first branch direction instruction D1 is held in the fourth branch information register 54.

In the fourth machine cycle, the branch instruction B1 and the first through the third predicted branch instructions C1 to C3 are processed in the operand reading, the operand address translating and generating, and the instruction decoding stages. Responsive to the "no go" to branch address set in the instruction address register 41, the fourth predicted branch instruction C4 is processed in the instruction reading stage. In the manner depicted, the second flip-flop circuit 72 holds the logic zero value because neither the first nor the second prediction error signal is produced with the logic one value. This activates the third prediction checking circuit 68.

The third prediction checking circuit 68 now compares the predicted destination address held in the third branch information register 53 for the first predicted branch instruction C1 with the "go" to branch destination address supplied from the instruction address translating circuit 33 for the first branch direction instruction D1. Inasmuch as these addresses are different, the third prediction checking circuit 68 supplies the instruction prefetch control circuit 47 with the third prediction error signal of the logic one value as depicted and delivers the third BHT renewal signal and the third prefetch correcting signal to the fourth and the fifth flip-flop circuits 74 and 75, both with the logic one value. In the manner also depicted, the fourth branch information register 54 supplies the selectors 42 and 62 with the (third) corrected address which is the "go" to branch destination address of the first branch direction instruction D1. Supplied with the third prediction error signal of the logic one value, the instruction prefetch control circuit 47 makes the selectors 42 and 62 select the corrected address. The first through the fourth predicted branch instructions C1 to C4 are cancelled.

In the fifth machine cycle, the fourth and the fifth flip-flop circuits 74 and 75 hold the fourth BHT renewal signal and the fourth prefetch correcting signal, both of the logic one value in the manner depicted. The branch instruction B1 is processed in the executing stage. Responsive to the "go" to branch destination address set in the instruction address register 41, the first branch direction instruction D1 is processed in the instruction reading stage. The request address adder 45 supplies the the selectors 42 and 62 with the "no go" to branch address $<<D1>+8>$ of a second branch direction signal D2 (not shown). Processing the branch instruction B1, the instruction executing unit 35 supplies the fourth prediction checking circuit 69 and the second instruction address selector 87 with the branch indicating signal of the logic one value as depicted. Responsive to the branch indicating signal of the logic one value, the second instruction address selector 87 supplies the address recover selector 62 and the selected address register 63 with the selected address which is the "go" to branch destination address held in the fifth branch information register 55 for the first branch direction instruction D1 in this event. The request address selector 62 is supplied with the instruction address which is held in the fifth branch information register 55 for the branch instruction B1.

Also in the fifth machine cycle, the fourth prediction checking circuit 69 makes use of the validity bit V held in the fourth branch information register 54 with the logic one value for the branch instruction B1, the branch indicating signal of the logic one value, and the logic one values held in the fourth and the fifth flip-flop circuits 74 and 75 and delivers the fourth prediction error signal to the instruction prefetch control circuit 47 with the logic zero value as depicted and the BHT renewal indicating signal to the instruction prefetch control circuit 47 and the sixth flip-flop circuit 76 with the logic one value in the manner also depicted. Inasmuch as the fourth prediction error signal has the logic zero value, the instruction prefetch control circuit 47 responds to the address hit signal of the logic zero value and makes the selectors 42 and 62 select the "no go" to branch address of the second branch direction instruction D2. Responsive to the BHT renewal indicating signal of the logic one value, the instruction prefetch control circuit 47 makes the address recover selector 62 select the "no go" to branch address of the second branch direction instruction D2. If the first branch direction instruction D1 is again a branch instruction, the address hit signal of the logic one value makes the address recover selector 62 select the "go" to branch destination address which is produced by the branch history table 46 for a certain branch destination instruction indicated by the first branch direction instruction D1.

In the sixth machine cycle, the sixth flip-flop circuit 76 holds the logic one value of the BHT renewal indicating signal. The selected address register 63 is supplied with the selected address which is the instruction address of the first branch direction instruction D1. The address recover register 61 is loaded with the "no go" to branch address of the second branch direction instruction D2. The instruction address register 41 is loaded with the write address which is the instruction address of the branch instruction B1. Supplied with the BHT renewal indicating signal of the logic one value, the instruction prefetch control circuit 47 carries out the history updating stage on the branch instruction B1. Responsive to the write indicating signal of the sixth flip-fop circuit 76, the selected address is transferred from the selected address register 63 to the branch history table 46 and stored at the write address indicated by the instruction address register 41. The validity bit V is kept at the logic one value at the write address. The first branch direction instruction D1 is processed in the instruction decoding stage.

In the seventh machine cycle, the first branch direction instruction D1 is processed in the operand address generating stage. The instruction address of the second branch direction instruction D2 is set in the instruction address register 41 from the address recover register 61. The second branch direction instruction is processed in the instruction reading stage. The request address adder 45 calculates the "no go" to branch address $<<D1>+16>$ of a third branch direction instruction D3 (not shown).

Referring to FIG. 17, the instruction prefetching device will be described with reference again to FIG. 1. Seven instructions are shown in a bottom part. It will be assumed that a conditional branch instruction CB1 indicates a branch destination address of a first indicated branch instruction C1, that the branch history table 46 indicates a branch destination address of a predicted branch instruction D1 for the conditional branch instruction CB1, and that the branch condition indicates the "no go" to branch direction upon the executing stage of the conditional branch instruction CB1 with the result that a first "no go" to branch instruction A1 should actually be processed immediately following the conditional branch instruction CB1.

In the zeroth machine cycle, the instruction address of the conditional branch instruction CB1 is set in the instruction address register 41. The conditional branch instruction CB1 is processed in the instruction reading stage. The request address adder 45 supplies the request address selector 42 and the address recover selector 62 with the "no go" to branch address of the first "no go" to branch instruction A1. The branch history table 46 delivers the address hit signal of the logic one value to the instruction prefetch control circuit 47 and supplies the selectors 42 and 62 with the "go" to branch address of the first indicated branch instruction C1. Responsive to the address hit signal of the logic one value, the instruction prefetch control circuit 47 makes the selectors 42 and 62 select the "go" to branch address rather than the "no go" to branch address.

In the first machine cycle, the conditional branch instruction CB1 is processed in the instruction decoding stage. The "go" to branch address is set in the instruction address register 41 and the address recover register 61. Responsive to the content of the instruction address register 41, the first indicated branch instruction C1 is processed in the instruction reading stage. The address hit signal is switched to the logic zero value. the request address adder 45 supplies the selectors 42 and 62 with the "no go" to branch address of a second indicated branch instruction C2. Responsive to the address hit signal of the logic zero value, the instruction prefetch control circuit 47 makes the selectors 42 and 62 select the "no go" to branch address.

In the second machine cycle, the conditional branch instruction CB1 and the first indicated branch instruction C1 are processed in the operand address generating and the instruction decoding stages. The "no go" to branch address is set in the instruction address register 41 and the address recover register 61. Responsive to the content of the instruction address register 41, the second indicated branch instruction C2 is processed in the instruction reading stage. The address hit signal is kept at the logic zero value. The request address adder 45 supplies the selectors 42 and 62 with the "no go" to branch address of a third indicated branch instruction C3. Responsive to the address hit signal of the logic zero value, the instruction prefetch control circuit 47 makes the selectors 42 and 62 select the "no go" to branch address.

In the third machine cycle, the conditional branch instruction CB1 and the first and the second indicated branch instructions C1 and C2 are processed in the operand address translating and generating, and the instruction decoding stages. In response to the "no go" to branch address set in the instruction address register 41, the third indicated branch instruction C3 is processed in the instruction reading stage. The request address adder 45 supplies the selectors 42 and 62 with the "no go" to branch address of a fourth indicated branch instruction C4. The instruction prefetch control circuit 47 makes the selectors 42 and 62 select the "no go" to branch address. On the other hand, the instruction address translating circuit 33 supplies the "go" to branch destination address of the predicted branch instruction D1 to the fourth branch information register 54, the third prediction checking circuit 68, and the first instruction address selector 86.

As depicted for the third machine cycle near the top line, the validity bit V of the logic one value and the predicted destination address of the first indicated branch instruction C1 are held in the third branch information register 53. The "go" to branch destination address of the predicted branch instruction D1 is held in the fourth branch information register 54.

In the fourth machine cycle, the conditional branch instruction CB1 and the first through the third indicated branch instructions C1 to C3 are processed in the operand reading, the operand address translating and generating, and the instruction decoding stages. Responsive to the "no go" to branch address set in the instruction address register 41, the fourth indicated branch instruction C4 is processed in the instruction reading stage. It is to be noted here that neither the first nor the second prediction error signal is produced with the logic one value. The second flip-flop circuit 72 therefore holds the logic zero value, which activates the third prediction checking circuit 68. As depicted, the third prediction checking circuit 68 supplies the instruction prefetch control circuit 47 with the third prediction error signal of the logic one value in response to the validity bit V held in the third branch information register 53, the predicted destination address held in the third branch information register 53 for the first indicated branch instruction C1, and the "go" to branch destination address supplied from the instruction address translating circuit 33 for the predicted branch instruction D1. Although not depicted, the third BHT renewal signal and the third prefetch correcting signal are delivered to the fourth and the fifth flip-flop circuits 74 and 75 also with the logic one value.

Also in the fourth machine cycle, the "go" to branch destination address of the predicted branch instruction D1 is held in the fourth branch information register 54 and supplied therefrom to the selectors 42 and 62 as the (second) corrected address in the manner depicted. The validity bit V of the logic one value is delivered from the fourth branch information register 54 to the fourth prediction checking circuit 9. Responsive to the third prediction error signal of the logic one value, the instruction prefetch control circuit 47 makes the selectors 42 and 62 select the corrected address. The first through the fourth indicated branch instructions C1 to C4 are cancelled.

In the fifth machine cycle, the fourth and the fifth flip-flop circuits 74 and 75 hold the third BHT renewal and the third prefetch correcting signals, both of the logic one value, as depicted. The conditional branch instruction CB1 is processed in the executing stage. Responsive to the "no go" to branch address set in the instruction address register 41 as the selected address, the predicted branch instruction D1 is processed in the instruction reading stage. The request address adder 45 supplies the selectors 42 and 62 with the "no go" to branch address of an instruction which next follows the predicted branch instruction D1. Processing the conditional branch instruction CB1, the instruction executing unit 35 supplies the fourth prediction checking circuit 69 and the second instruction address selector 87 with the branch indicating signal indicative of the "no go" to branch direction by the logic zero value in the manner depicted.

Also in the fifth machine cycle, the fourth prediction checking circuit 69 supplies the instruction prefetch control circuit 47 with the fourth prediction error signal of the logic one value as depicted. The BHT renewal indicating signal is delivered to the instruction prefetch control circuit 47 and the sixth flip-flop circuit 76 with the logic one value in the manner also depicted. This is because the fourth prediction checking circuit 69 is supplied with the validity bit V of the logic one value from the fourth branch information register 54, the branch indicating signal of the logic zero value, and the logic one values held in the fourth and the fifth flip-flop circuits 74 and 75.

With respect to the fifth machine cycle, the branch indicating signal, is now used as the fourth prefetch correcting signal. Responsive to the branch indicating signal of the logic zero value, the second instruction address selector 87 supplies the address recover selector 62 and the selected address register 63 with the selected address which is the "no go" to branch destination address calculated by the third instruction address adder 58 for the first "no go" to branch instruction A1 as depicted. The request address selector 42 is supplied with the instruction address which is held in the fifth branch information register 55 for the conditional branch instruction CB1. Responsive to the fourth prediction error signal of the logic one value, the instruction prefetch control circuit 47 makes the request address selector 42 select the instruction address of the conditional branch instruction CB1 as the write address and moreover makes the address recover selector 62 select the selected address of the first "no go" to branch instruction A1.

In the sixth machine cycle, the selected address register 63 holds the selected address of the first "no go" to branch instruction A1 in the manner depicted. The selected address is set in the address recover register 61 in the manner which is also depicted. The selected address is therefore delivered to the request address selector 42. The write address is set in the instruction address register 41. Supplied with the write indicating signal from the sixth flip-flop circuit 76, the conditional branch instruction CB1 is processed in the history updating stage. More particularly, the validity bit V is reset in the branch history table 46 to the logic zero value at the write address. The selected address may be transferred to the branch history table 46 and stored at the write address. Supplied with the BHT renewal indicating signal of the logic one value, the instruction prefetch control circuit 47 makes the request address selector 42 select the selected address of the first "no go" to branch instruction A1.

In the seventh machine cycle, the selected address is set in the instruction address register 41. The first "no go" to branch instruction A1 is processed in the instruction reading stage. The request address adder 45 calculates the "no go" to branch address $<<A1>+8>$ of a second "no go" to branch instruction A2 (not shown).

Figure 18:
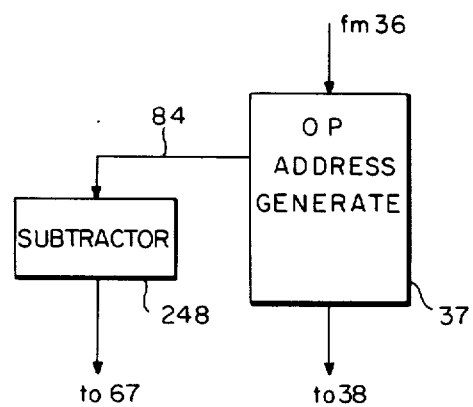
FIG. 18 is a partial block diagram of an instruction prefetching device according to a second embodiment of this invention.

Referring to FIG. 18, the description will proceed to an instruction prefetching device according to a second embodiment of this invention. A subtracter 248 is used instead of the comparator 85 depicted in FIG. 1. More specifically, the subtracter 248 is supplied with the variable count through the count line 84 and subtracts one from the variable count to deliver a count zero signal to the second prediction checking circuit 67. The count zero signal is given the logic zero value unless the variable count is specifically equal to unity. When the variable count is reduced to unity, the count zero signal is given the logic one value. It will readily be understood that the instruction prefetching device is operable in the manner thus far described. Like the comparator 85, the subtracter 248 may be regarded as a part of the second prediction checking circuit 67.

From the foregoing, it is understood that a combination of the instruction prefetch control circuit 47, the request address selector 42, the instruction address adders 56 through 58, and the instruction address selectors 86 and 87 may conveniently be regarded as the instruction prefetch controlling arrangement or circuit. The fact may be appreciated that an instruction prefetching device may comprise at least one of the first through the third prediction checking circuits 66 to 68 according to this invention. Even in this event, an error in the entries of the branch history table 46 is detected in advance, in one of the stages prior to the executing stage.

What is claimed is:

1. An instruction prefetching device for use in combination with a data processing system including executing means for executing a sequence of instructions with each instruction processed successively in a plurality of stages which include an executing stage, said instruction prefetching device carrying out prefetching of instructions from said sequence and including predicting means, responsive to a particular instruction address, for producing branch information obtained when an instruction similar to said particular instruction, having an instruction address identical to an address in said particular instruction, was processed in said executing stage in an instruction execution prior to the prefetch of said particular instruction, said predicting means producing said branch information as predicted branch information, said instruction prefetching device comprises:

prediction checking means, coupled to said predicting means and to said executing means, for carrying out a check prior to said executing stage for said particular instruction, said check determining whether said predicted branch information is correct or incorrect; and prefetch controlling means, coupled to said predicting means and to said prediction checking means, for allowing continuance of the prefetch of a subsequent instruction in compliance with said predicted branch information when said predicted branch information is correct, said prefetch controlling means correcting said continuance when said predicted branch information is incorrect, said subsequent instruction following said particular instruction in said sequence.

2. An instruction prefetching device as claimed in claim 1, said stages including an instruction decoding stage prior to said executing stage, wherein said prediction checking means is for carrying out said check immediately after said particular instruction is processed in said instruction decoding stage.

3. An instruction prefetching device as claimed in claim 2, said particular instruction being processed in said instruction decoding stage to produce an actual branch direction indicative of a "no go" to branch direction and not indicative of "go" to branch direction, said predicted branch information comprising: a predicted branch direction for said particular instruction, wherein said prediction checking means is responsive to an actual branch direction for carrying out said check regarding said predicted branch direction, in order to produce a result of said check which represents whether said predicted branch direction indicates said "go" to branch direction or said "no go" to branch direction.

4. An instruction prefetching device as claimed in claim 3, wherein said prefetch controlling means is responsive to said result of check, and allows said continuance when said result of check represents said "no go" to branch direction as said predicted branch direction, said prefetch controlling means correcting said predicted branch direction to said "no go" to branch direction and then allowing prefetch of a next instruction when said result of check represents said "go" to branch direction as said predicted branch direction, said next instruction next following said particular instruction in said sequence in said "no go" to branch direction.

5. An instruction prefetching device as claimed in claim 2, said stages including an operand address generating stage and an operand address translating stage prior to said executing stage and successively following said instruction decoding stage, wherein said prediction checking means produces a first result of check immediately after said particular instruction is processed in said instruction decoding stage, produces a second result of check immediately after said particular instruction is processed in said operand address generating stage, and produces, in response to said first and said second results, a third result of check immediately after said particular instruction is processed in said operand address translating stage.

6. An instruction prefetching device as claimed in claim 5, wherein said prefetch controlling means is responsive to said first through said third results of check for allowing said continuance when said first through said third results of check indicate that said predicted branch information is correct, said prefetch controlling means correcting said predicted branch information into corrected branch information and then allowing said continuance, in compliance with said corrected branch information, when at least one of said first through said third results of check indicates that said predicted branch information is incorrect.

7. An instruction prefetching device as claimed in claim 5, said executing means producing a branch indicating signal indicating an actual branch direction according to a result obtained when said particular instruction is processed in said executing stage, said predicted branch information comprising a predicted branch direction for said particular instruction, said instruction prefetching device including a prediction checking circuit, coupled to said predicting means and said executing means and responsive to said branch indicating signal, for checking said predicted branch direction to produce a final result of check indicative of whether said predicted branch direction is noncoincident or coincident with said actual branch direction, wherein:

said prediction checking means for producing a first result of check immediately after said particular instruction is processed in said instruction decoding stage, for producing a second result of check immediately after said particular instruction is processed in said operand address generating stage, and for producing in response to said first and said second results a third result of check immediately after said particular instruction is processed in said operand address translating stage;

said prediction checking circuit being responsive to said first through said third results of check for producing said final result of check only when said first through said third results of check indicates that said predicted branch information is correct.

8. An instruction prefetching device as claimed in claim 7, wherein said prefetch controlling means is responsive to said first through said third results of check for allowing said continuance when said first through said third results of check indicate that said predicted branch information is correct, said prefetch controlling means correcting said predicted branch information into corrected branch information and then allowing said continuance in compliance with said corrected branch information when at least one of said first through said third results of check indicates that said predicted branch information is incorrect, said prefetch controlling means allowing said continuance when said final result of check indicates that said predicted branch direction is coincident with said actual branch direction, said prefetch controlling means also correcting said predicted branch direction to said actual branch direction, and then allowing said continuance in compliance with said actual branch direction.

9. An instruction prefetching device as claimed in claim 1, said stages including an operand address generating stage prior to said executing stage, wherein said prediction checking means carries out said check immediately after said particular instruction is processed in said operand address generating stage.

10. An instruction prefetching device as claimed in claim 9, said particular instruction being processed in said operand address generating stage to produce a signal indicative of whether said particular instruction always indicates a "go" to branch direction said predicted branch information comprising a predicted branch direction for said particular instruction, wherein said prediction checking means is responsive to said signal for carrying out said check regarding said predicted branch direction to produce a result of check which represents whether said predicted branch direction indicates said "no go" to branch direction or indicates said "go" to branch direction.

11. An instruction prefetching device as claimed in claim 10, wherein said prefetch controlling means is responsive to said result of check for allowing said continuance when said result of check represents said "go" to branch direction as said predicted branch direction, said prefetch controlling means correcting said predicted branch direction to said "go" to branch direction and then allowing prefetch of a next instruction when said result of check represents said "no go" to branch direction as said predicted branch direction, said next instruction next following said particular instruction in said "go" to branch direction.

12. An instruction prefetching device as claimed in claim 9, said particular instruction being processed in said operand address generating stage to produce a variable count and a signal indicative of whether or not said particular instruction is a branch count instruction which indicates a "go" to branch direction, or a "no go" to branch direction, unless or only when, said variable count is equal to unity, respectively, said predicted branch information including a predicted branch direction for said branch count instruction, wherein said prediction checking means is responsive to said variable count and said signal for carrying out said check regarding said predicted branch direction to produce a result of check which represents for said branch count instruction whether or not said predicted branch direction indicates said "no go" to branch direction, or said "go" to branch direction, when said variable count is not, or is, equal to unity, respectively.

13. An instruction prefetching device as claimed in claim 12, wherein said prediction checking means comprises a comparator for comparing said variable count with unity to produce a count one signal indicative of whether said variable count is not, or is, equal to unity, and means responsive to said count one signal and said signal for carrying out said check regarding said predicted branch direction to produce said result of check with said result of check representing whether or not said predicted branch direction indicates said "no go" to branch direction, or said "go" to branch direction, when said count one signal indicates that said variable count is not, and is, equal to unity, respectively.

14. An instruction prefetching device as claimed in claim 12, wherein said prediction checking means comprises a subtracter for subtracting one from said variable count to produce a count zero signal indicative of whether said variable count less one is not, or is, equal to zero, and means responsive to said count zero signal and said signal for carrying out said check regarding said predicted branch direction to produce said result of check, with said result of check made to represent for said branch count instruction whether or not said predicted branch direction indicates said "no go" to, or said "go" to, branch directions when said count zero signal indicates that said variable count less one is not, or is, equal to zero, respectively.

15. An instruction prefetching device as claimed in claim 14, wherein said prefetch controlling means is responsive to said result of check for allowing said continuance when said result of check represents said "go" to, or said "no go" to, branch directions as said predicted branch direction when said variable count is not, or is, equal to unity, respectively; said prefetch controlling means correcting said predicted branch direction to said "go" to branch direction and then allowing prefetch of a branch destination instruction whenever said result of check does not represent said "go" to branch direction as said predicted branch direction, said branch destination instruction next following said branch count instruction in said sequence in said "go" to branch direction, said prefetch controlling means correcting said predicted branch direction to said "no go" to branch direction and then allowing prefetch of a next instruction whenever said result of check does not represent said "no go" to branch direction as said predicted branch direction, said next instruction next following said branch count instruction is said sequence in said "no go" to branch direction.

16. An instruction prefetching device as claimed in claim 9, said stages including an operand address translating stage prior to said executing stage and following said operand address generating stage, wherein said prediction checking means carries out said check immediately after said particular instruction is processed in said operand address translating stage.

17. An instruction prefetching device as claimed in claim 16, said stages including an instruction decoding stage prior to said operand address generating stage and an instruction address translating stage prior to said executing stage, said particular instruction being processed in said instruction decoding stage to produce a signal indicative of whether said particular instruction indicates a next instruction or a branch destination instruction, said next instruction immediately following said particular instruction in said sequence in a "no go" to branch direction, said branch destination instruction next following said particular instruction in said sequence in a "go" to branch direction, said branch destination instruction being processed in said instruction address translating stage to produce a decoded branch destination address concurrently when said particular instruction is processed in said operand address translating stage, said predicted branch information comprising a predicted branch direction for said particular instruction and a predicted destination address of said branch destination instruction, wherein said prediction checking means comprises;

first means, responsive to said signal for carrying out said check regarding said predicted branch direction in order to produce one of a first and a second result of check at a time, said first result of check representing whether or not said predicted branch direction indicates said "go" to branch direction when said particular instruction indicates said next instruction, said second result of check representing whether or not said predicted branch direction indicates said "no go" to branch direction when said particular instruction indicates said branch destination instruction; and second means, responsive to said decoded branch destination address and said first and said second results of check, for carrying out said check regarding said predicted destination address to produce a third result of check which represents whether said predicted destination address is noncoincident or coincident with said decoded branch destination address if said first result of check does not represent said "go" to branch direction as said predicted branch direction when said particular instruction indicates said next instruction and if said second result of check does not represent said "no go" to branch direction as said predicted branch direction when said particular instruction indicates said branch destination instruction, said second means being quiescent if said first result of check represents said "no go" to branch direction as said predicted branch direction when said particular instruction indicates said branch destination instruction and if said second result of check represents said "go" to branch direction as said predicted branch direction when said particular instruction indicates said next instruction.

18. An instruction prefetching device as claimed in claim 17, wherein said prefetch controlling means is responsive to said first through said third results of check for allowing said continuance if said first result of check does not represent said "go" to branch direction as said predicted branch direction when said particular instruction indicates said next instruction and for allowing said continuance if said second result of check does not represent said "no go" to branch direction as said predicted branch direction when said particular instruction indicates said branch destination instruction, and if said third result of check represents coincidence between said predicted destination address and said decoded branch destination address, said prefetch controlling means correcting said predicted branch direction to said "no go" to branch direction and then allowing prefetch of said next instruction if said first result of check represents said "go" to branch direction as said predicted branch direction when said particular instruction indicates said next instruction, said prefetch controlling means correcting said predicted destination address to said decoded branch destination address and then allowing prefetch of said branch destination instruction if said first result of check represents said "go" to branch direction as said predicted branch direction when said particular instruction indicates said branch destination instruction and if said third result of check represents noncoincidence between said predicted destination address and said decoded branch destination address, said prefetch controlling means correcting said predicted branch direction to said "go" to branch direction and then allowing prefetch of said branch destination instruction if said second result of check does not represent said "go" to branch direction as said predicted branch direction when said particular instruction indicates said branch destination instruction and if said third result of check represents coincidence between said predicted destination address and said decoded branch destination address.

19. An instruction prefetching device as claimed in claim 1, said stages including an operand address translating stage prior to said executing stage, wherein said prediction checking means carries out said check immediately after said particular instruction is processed in said operand address translating stage.

20. An instruction prefetching device as claimed in claim 19, said stages including an instruction decoding stage prior to said operand address translating stage and an instruction address translating stage prior to said executing stage, said particular instruction being processed in said instruction decoding stage to produce a signal indicative of whether said particular instruction indicates a next instruction or a branch destination instruction, said next instruction immediately following said particular instruction in said sequence in a "no go" to branch direction, said branch destination instruction immediately following said particular instruction in said sequence in a "go" to branch direction, said branch destination instruction being processed in said instruction address translating stage to produce a decoded branch destination address concurrently when said particular instruction is processed in said operand address translating stage, said predicted branch information comprising a predicted branch direction for said particular instruction and a predicted destination address of said branch destination instruction, wherein said prediction checking means comprises:

first means responsive to said signal for carrying out said check regarding said predicted branch direction to produce one of a first and a second result of check at a time, said first result of check representing whether or not said predicted branch direction indicates said "go" to branch direction when said particular instruction indicates said next instruction, said second result of check representing whether or not said predicted branch direction indicates said "no go" to branch direction when said particular instruction indicates said branch destination instruction; and second means, responsive to said decoded branch destination address and said first and said second results of check, for carrying out said check regarding said predicted destination address to produce a third result of check which represents whether said predicted address is noncoincident or coincident with said decoded branch destination address if said first result of check does not represent said "go" to branch direction as said predicted branch direction when said particular instruction indicates said next instruction and if said second result of check does not represent said "no go" to branch direction as said predicted branch direction when said particular instruction indicates said branch destination instruction, said second means being quiescent if said first result of check represents said "no go" to branch direction as said predicted branch direction when said particular instruction indicates said branch destination instruction and if said second result of check represents said "go" to branch direction as said branch direction as said predicted branch direction when said particular instruction indicates said next instruction.

21. An instruction prefetching device as claimed in claim 20, wherein said prefetch controlling means is responsive to said first through said third results of check for allowing said continuance if said first result of check does not represent said "go" to branch direction as said predicted branch direction when said particular instruction indicates said next instruction and for allowing said continuance if said second result of check does not represent said "no go" to branch direction as said predicted branch direction when said particular instruction indicates said branch destination instruction and if said third result of check represents coincidence between said predicted destination address and said decoded branch destination address, said prefetch controlling means correcting said predicted branch direction to said "no go" to branch direction and then allowing prefetch of said next instruction if said first result of check represents said "go" to branch direction as said predicted branch direction when said particular instruction indicates said next instruction, said prefetch controlling means correcting said predicted destination address to said decoded branch destination address and then allowing prefetch of said branch destination instruction if said first result of check represents said "go" to branch direction as said predicted branch direction when said particular instruction indicates said branch destination instruction and if said third result of check represents noncoincidence between said predicted destination address and said decoded branch destination address, said prefetch controlling means correcting said predicted branch direction to said "go" to branch direction and then allowing prefetch of said branch destination instruction if said second result of check does not represent said "go" to branch direction as said predicted branch direction when said particular instruction indicates said branch destination instruction and if said third result of check represents coincidence between said predicted destination address and said decoded branch destination address.

* * * * *